(12) United States Patent
Merry

(10) Patent No.: US 8,717,366 B2
(45) Date of Patent: May 6, 2014

(54) METHOD AND APPARATUS FOR RENDERING A STROKED CURVE

(75) Inventor: Bruce Merry, Cambridge (GB)

(73) Assignee: Arm Limited, Cambridge (GB)

( * ) Notice: Subject to any disclaimer, the term of this patent is extended or adjusted under 35 U.S.C. 154(b) by 342 days.

(21) Appl. No.: 12/844,711

(22) Filed: Jul. 27, 2010

(65) Prior Publication Data
US 2011/0025693 A1 Feb. 3, 2011

(30) Foreign Application Priority Data

Jul. 28, 2009 (GB) .................................. 0913170.7

(51) Int. Cl.
G06T 11/20 (2006.01)
(52) U.S. Cl.
USPC ........................................................ 345/442
(58) Field of Classification Search
CPC ..... G06T 11/20; G06T 11/203; G06T 15/005; G06T 15/00; G06T 15/10; G06T 15/20; G06T 15/205; G06F 17/242; G06F 17/241
USPC ........................................................ 345/442
See application file for complete search history.

(56) References Cited

U.S. PATENT DOCUMENTS

| | | | |
|---|---|---|---|
| 5,857,067 A | 1/1999 | Hassett | |
| 6,348,924 B1 * | 2/2002 | Brinsmead | 345/441 |
| 7,098,924 B2 * | 8/2006 | Prokopenko et al. | 345/581 |
| 7,180,523 B1 | 2/2007 | Macri | |
| 7,239,319 B2 | 7/2007 | Loop | |

(Continued)

FOREIGN PATENT DOCUMENTS

| | | |
|---|---|---|
| WO | WO2007064280 | 6/2007 |
| WO | WO2009117619 | 9/2009 |

OTHER PUBLICATIONS

Diego Nehab, Hugues Hoppe, Random-Access Rendering of General Vector Graphics, 2008, ACM Transactions on Graphics, 27(5), Article 135, pp. 1-10.*

(Continued)

*Primary Examiner* — Xiao M. Wu
*Assistant Examiner* — Michael J Cobb
(74) *Attorney, Agent, or Firm* — Vierra Magen Marcus LLP

(57) ABSTRACT

A method of rendering a stroked curve for display in a graphics processing system in which an input stroked curve 2 to be displayed, such as a character in a computer font or a portion thereof, is defined in user space 4 and projected into a surface space 6 for display. For each of one or more sampling points in the surface space 6, a corresponding sampling position in a projected space 12 is determined, and predetermined information is used to estimate the extent in a defined direction of a projected form of the stroked curve in the projected space 12 at a position along the length of the projected form of the stroked curve corresponding to the position along the length of the projected form of the stroked curve of the sampling position in the projected space 12. The estimated extent is then used to determine whether the sampling position in question falls within the stroked curve or not, thereby allowing suitable rendering data to be assigned to the sampling point.

17 Claims, 7 Drawing Sheets

(56) References Cited

U.S. PATENT DOCUMENTS

| | | | |
|---|---|---|---|
| 7,343,053 B2* | 3/2008 | Dresevic et al. | 382/299 |
| 2004/0006749 A1* | 1/2004 | Fux et al. | 715/535 |
| 2005/0162413 A1* | 7/2005 | Dresevic et al. | 345/179 |
| 2005/0280656 A1* | 12/2005 | Maillot | 345/606 |
| 2006/0227140 A1* | 10/2006 | Ramani et al. | 345/441 |
| 2007/0097123 A1 | 5/2007 | Loop | |
| 2008/0043024 A1* | 2/2008 | Schiwietz et al. | 345/442 |
| 2009/0147016 A1* | 6/2009 | Barone et al. | 345/581 |
| 2010/0097382 A1 | 4/2010 | Nystad | |
| 2010/0097383 A1 | 4/2010 | Nystad | |
| 2010/0141659 A1* | 6/2010 | Bourd et al. | 345/442 |

OTHER PUBLICATIONS

GB Examination Report dated Nov. 29, 2011, GB Patent Application No. GB1012707.4.

GB Search Report dated Nov. 18, 2009, GB Patent Application No. GB0913170.7.

Loop, "Resolution Independent Curve Rendering using Programmable Graphics Hardware," 2005, ACM SIGGRAPH 2005 Papers (Los Angeles, California, Jul.-Aug. 4, 2005).

Taubin, "Distance Approximations for Rasterizing Implicit Curves," ACM TOG vol. 13, Issue 1, pp. 3-42.

GB Combined Search and Examination Report dated Nov. 4, 2010, GB Patent Application No. GB1012707.4.

* cited by examiner

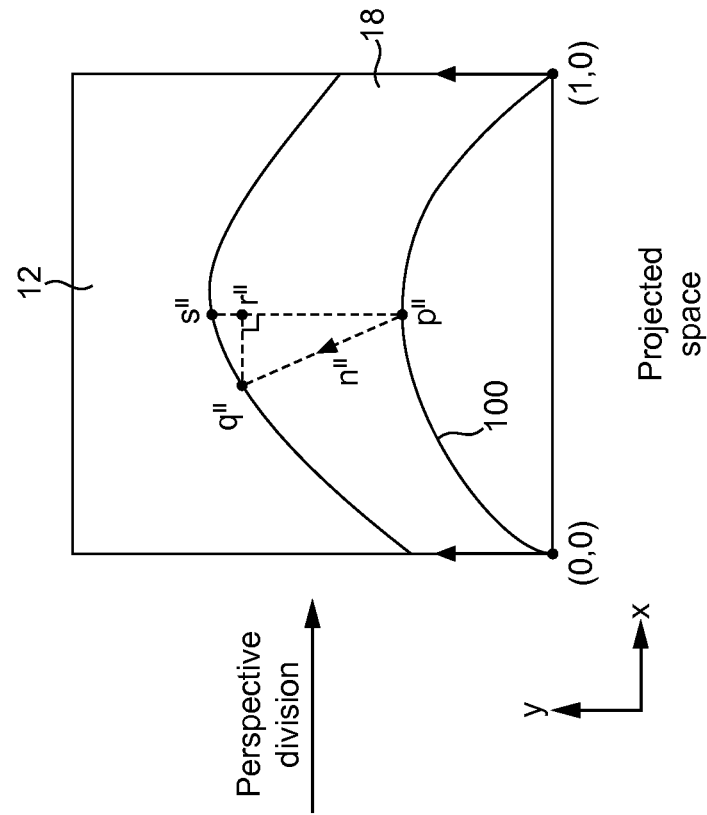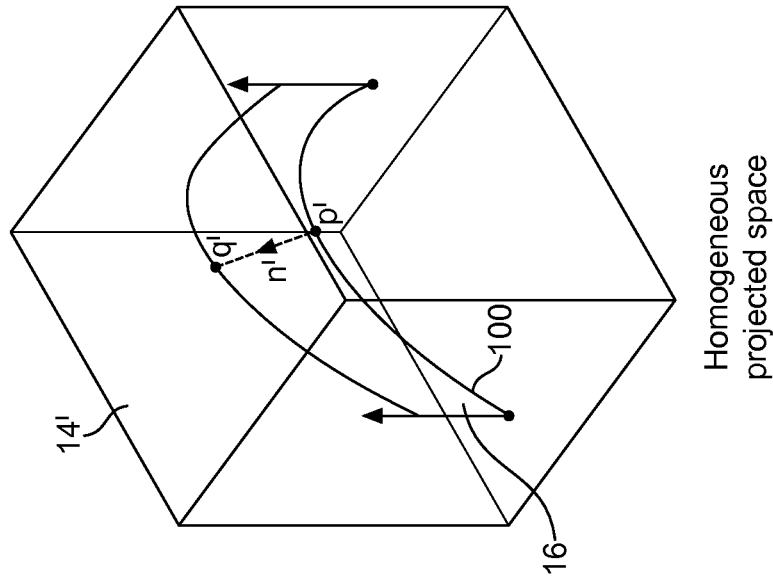
FIG. 5

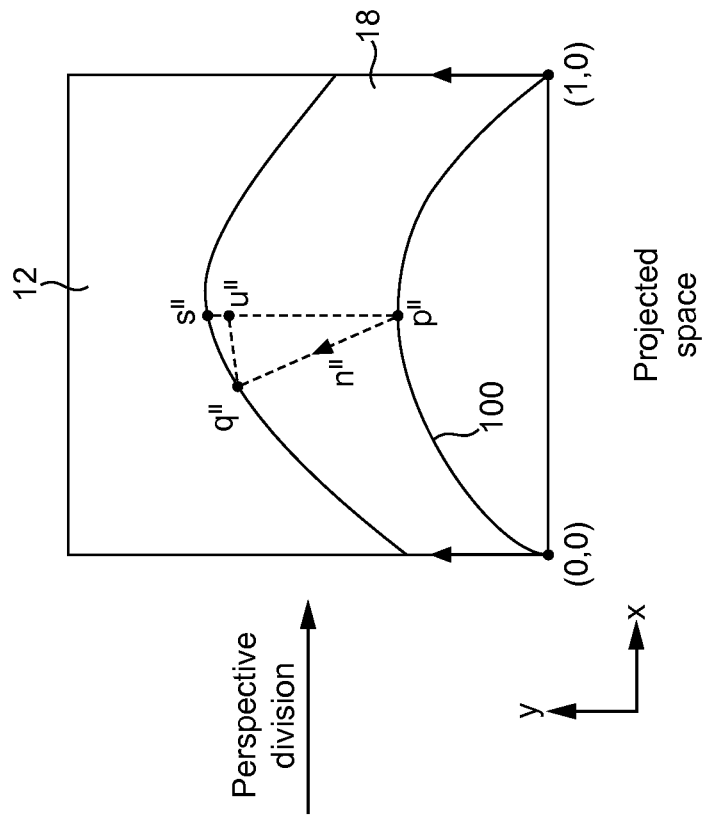
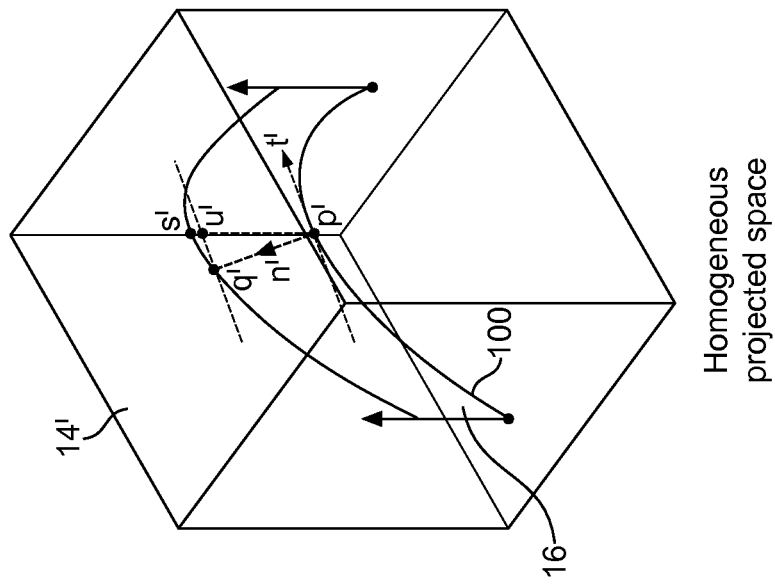
FIG. 6

METHOD AND APPARATUS FOR RENDERING A STROKED CURVE

CROSS-REFERENCE TO RELATED APPLICATION

This application claims priority from GB Patent Application No. 0913170.7, filed on Jul. 28, 2009, which is herein expressly incorporated by reference in its entirety.

BACKGROUND

The present invention relates to the process of rendering images in computer graphics systems, and in particular to the rendering of stroked curves in such systems.

In recent years it has become increasingly common to utilise vector graphics in computer graphics. As is known, in the art, one key advantage of vector graphics over raster graphics is the ability to provide resolution-independent images, i.e. images that can essentially be scaled indefinitely without degrading. For example, the individual characters (e.g. letters) in computer fonts, such as TrueType™, are typically stored as predefined vector images. Each stored image, e.g. letter, is then manipulated (scaled, rotated, etc) as desired so as to display the desired image on the display device, e.g. screen, printer, etc.

Vector graphics are based on the use of individually defined geometrical objects, and are typically described by one or more line segments, e.g. straight lines or curves, such as quadratic (bezier) curves, elliptical arcs, and cubic (bezier) curves, that are connected together at anchor points to form a path.

Vector graphics objects/paths are defined and manipulated in a space, which is referred to herein as "user space". In order to output the vector graphics objects/paths to a video display or printer, however, the objects/paths as defined in user space need to be converted into a suitable form so as to be displayed on a screen or to be outputted on a printer. This conversion typically involves projecting the objects/paths as defined in user space to another space, commonly referred to as "surface space", that corresponds to the perspective (geometry) of the output display on which the objects/paths are to be viewed. The transformation between user space and surface space will be referred to as the "user-to-surface transformation".

Once the vector graphics objects/paths have been converted into surface space representations, they are then rendered.

This process, as is known in the art, typically involves generating one or more graphics primitives, such as triangles, that cover the surface space representations of the objects/paths and rasterising the primitives to a plurality of sampling points within the primitives which are then sampled to determine whether each sampling point falls within the projected objects/paths or not. Based on this determination, the plurality of sampling points are assigned data, such as red, green and blue (RGB) colour values and an "alpha" transparency value, as appropriate to allow the objects/paths to be correctly displayed. These processes are commonly referred to as rasterising and shading, respectively.

(In 3D graphics literature, the term "rasterisation" is sometimes used to mean both object conversion to sample positions and shading. However, herein, rasterisation will be used to refer to converting object data to sampling point addresses only.)

These processes are typically carried out, as is known in the art, by representing the sampling points using discrete graphical entities usually referred to as "fragments" on which the graphics processing operations (such as shading) are carried out. Thus, the fragments are, in effect, the graphics entities that are processed by the graphics processing system (that pass through the graphics pipeline).

Each fragment can reasonably be thought of as being effectively equivalent to a "pixel" of the scene being processed. Each fragment may correspond to a single or to a plurality of sampling points. Each fragment may correspond to a single pixel (picture element) in the final display (since as the pixels are the singularities in the final display, there may be a one-to-one mapping between the fragments the graphics processor operates on and the pixels of the display). More typically, however, it will be the case that there is not a one-to-one correspondence between a fragment and a display pixel, for example where particular forms of post-processing, such as down-scaling, are carried out on the rendered image prior to displaying the final image.

Two types of objects that are commonly found in vector graphics are "filled" objects and "stroked" objects. The process of filling involves applying a single block of colour, gradient, pattern or image to the area within an object or closed path. The process of stroking meanwhile can be thought of effectively as adding a width to the path by dragging a line-shaped pen tip of a particular width along the path. More specifically, the centre point of the pen-tip follows the path, and the tip is orientated so as to always be perpendicular to the path. Equivalently, therefore, the boundary of a stroked path can also be defined by the set of points from which a line of length (at most) w/2 (for a stroked path of stroke width w), and which is perpendicular to the path, can be drawn to a point on the path.

The rendering of stroked paths, and of stroked curves in particular, is traditionally an expensive operation in terms of load on the CPU. For example, one common method of rendering a stroked path is to subdivide the path into a plurality of individual lines or filled paths on the CPU, which can then each be rendered separately. However, this is a processing-intensive operation. Another method that is often used for rendering stroked paths is to use dedicated curve rendering hardware. However, although this method does offer a solution to the reduction in performance associated with the above described subdivision technique, it requires dedicated hardware, which, for example, is not always available or desirable in graphics processing systems.

The Applicants accordingly believe there is scope for further techniques for rendering stroked paths, and in particular stroked curves, e.g. that may not need to use additional, dedicated hardware, but that can still achieve an improved level of performance in comparison to known subdivision techniques.

SUMMARY

According to a first aspect of the present invention, there is provided a method of rendering a stroked curve for display in a graphics processing system, the method comprising:

receiving an input stroked curve defined in user space to be displayed;

projecting the received stroked curve using a received transformation into a surface space for display; and for each of one or more sampling points in the surface space:

determining a corresponding sampling position in a projected space;

using predetermined information to estimate the extent in a defined direction of a projected form of the stroked curve to be displayed in the projected space at a position along the length of the projected form of the stroked curve to be displayed corresponding to the position along the length of the projected form of the stroked curve of the sampling position in the projected space;

using the estimated extent in the defined direction of the projected form of the stroked curve to be displayed in the projected space to determine whether the sampling position in the projected space falls within the projected form of the stroked curve or not; and assigning data for rendering the received stroked curve for display to the sampling point in surface space that corresponds to the sampling position in the projected space in accordance with said determination.

According to a second aspect of the present invention, there is provided an apparatus for rendering a stroked curve for display in a graphics processing system, the apparatus comprising:

means for receiving an input stroked curve defined in user space to be displayed;

means for projecting the received stroked curve using a received transformation into a surface space for display; and means for, for each of one or more sampling points in the surface space, determining a corresponding sampling position in a projected space;

means for using predetermined information to estimate the extent in a defined direction of a projected form of the stroked curve to be displayed in the projected space at a position along the length of the projected form of the stroked curve to be displayed corresponding to the position along the length of the projected form of the stroked curve of a sampling position in the projected space;

means for using the estimated extent in the defined direction of the projected form of the stroked curve to be displayed in the projected space to determine whether a sampling position in the projected space falls within the projected form of the stroked curve or not; and means for assigning data for rendering the received stroked curve for display to a sampling point in surface space that corresponds to a sampling position in the projected space in accordance with said determination.

In the present invention, an input stroked curve defined in user space to be displayed is rendered by first transforming the input stroked curve to a surface space (which will correspond, for example, to the screen onto which the stroked curve is to be displayed). As will be appreciated by those skilled in the art, this is similar to known, conventional techniques for rendering stroked curves.

However, in the present invention, rather than testing sampling points in the surface space directly against the stroked curve in surface space to see if they fall within the curve or not, the surface space sampling points are mapped to corresponding sampling positions in a "projected" space and those corresponding sampling positions in the "projected" space are then tested against a projected form of the stroked curve to be displayed in the projected space.

Thus, in the present invention, a stroked curve is rendered for display by, in effect, determining, for each of one or more sampling positions, whether or not a corresponding sampling position in a projected space falls within a projected form of the stroked curve in the projected space.

In particular, the Applicants have recognised that the determination of whether a sampling point is within the stroked curve in surface space can, in effect, be performed indirectly in relation to a projected form of the stroked curve in a "projected" space, and, moreover that this can provide for an efficient and straightforward way of determining which surface space sampling points fall within the stroked curve or not.

Moreover, the determination of whether a sampling position falls within the projected form of the stroked curve in the projected space or not is carried out in the present invention by using predetermined information to estimate the extent in a defined direction (e.g., and preferably, and as will be discussed further below, in a "width" direction) of the projected form of the stroked curve at the appropriate position along the length of the projected form of the stroked curve, i.e. at a position having the same position along the length of the projected form of the stroked curve as the sampling position in the projected space.

Again, as will be discussed further below, the Applicants have recognised that not only is it possible to render a stroked curve for display in this way, but that it can provide a number of advantages.

The results of the determination of whether the sampling positions in the projected space are within the projected form of the stroked curve are then used to assign suitable rendering data for displaying the stroked curve to the corresponding sampling positions in the surface space.

The present invention provides a number of advantages.

Firstly, the present invention uses predetermined information to estimate the extent in the defined (e.g. width) direction of the projected form of the stroked curve at points along its length, which, as will be discussed further below, can be, effectively, one-dimensional, and so can be stored as a one-dimensional table (e.g., and preferably, storing information for deriving "width" values for a series of "length" positions), and retrieved using a one-dimensional "look-up". This has advantages in terms of the amount of data that must be stored and in terms of the retrieving of that data in use (and thus in relation to memory usage and bandwidth, for example).

Equally, and as will be discussed further below, the calculations required to use the predetermined information of the present invention when rendering a stroked curve for display in the present invention are relatively straightforward to implement and can be implemented using existing and known graphics processing techniques and hardware. The present invention is thus, as will be discussed further below, suitable for and advantageous for use with known and existing graphics processing techniques and hardware.

Thus, and as will be explained further below, the present invention can be conveniently and effectively implemented in typical graphics processing systems without, for example, the need for significant modifications or additions to such systems.

Furthermore, the present invention can provide a more efficient and convenient mechanism for rendering stroked curves, and in particular for rendering those stroked curves that are needed repeatedly (multiple times) by an application or applications, such as curves that form characters, or portions of characters, of fonts, as compared, for example, to the use of "brute-force" sub-division and tessellation techniques, and without the need for dedicated curve rendering hardware.

The predetermined information relating to the projected form of the stroked curve used in the present invention can, as will be discussed further below, also be made invariant to translation, rotation and uniform scaling of the curve to which it relates, and to changes to the stroke width of the corresponding curve as defined in user space. This means that, for example, a given set of predetermined information in the manner of the present invention can be used to render various different forms of the corresponding stroked curve for display as defined in user space, thereby further enhancing the effectiveness and utility of the present invention.

The present invention may in general be used for any suitable and desired form of stroked curve to be displayed, although as will be discussed further below, it is particularly suited to the rendering for display of stroked curves that are likely to be repeatedly and frequently used, such as, and preferably, stroked curves that define a character (e.g. a letter) or a part of a character, of a font to be displayed.

The stroked curve to be displayed that the present invention will be used to render will, as will be appreciated by those skilled in the art, typically be provided to or indicated to the graphics processing system by an application that requires the curve to be displayed. At this stage, the stroked curve will, as discussed above, be defined in "user space".

The stroked curve as defined in user space may be defined in any suitable and desired manner, such as, and preferably, in terms of the position of the curve and one or more parameters relating to the curve.

For example, as described above, the stroked curve to be displayed will typically be defined in user space by a centre curve and an associated user space stroke width. The centre curve will typically be defined by the position of a plurality of control points in user space typically comprising a start point, an end point and one or more intermediate points, together with an indication of the type of curve to be drawn between the start and end points. For example, the centre curve of the stroke may comprise: a straight line; a quadratic bezier curve (requiring a single intermediate control point); a cubic bezier curve (requiring two intermediate control points); an elliptical arc; and a (non-uniform rational) B-spline.

Thus, in a preferred embodiment, the present invention includes a step of or means for receiving a stroked curve defined in user space to be rendered for display in the form of the position of a plurality of control points in user space, information indicating the type of curve, and information indicating the stroke width in user space.

The stroked curve (defined in user space) that is rendered for display using the process of the present invention may be the stroked curve as initially defined or indicated by, for example, the application that requires the curve to be drawn.

However, it is also possible for the stroked curve that is rendered for display using the present invention to be a curve that is derived from an, e.g., initial curve that is defined in user space. In other words, it is also contemplated that the stroked curve to be rendered using the process of the present invention may have been derived by transforming another or initial curve into a form in which it is to be processed in the manner of the present invention. For example, in a preferred embodiment, the stroked curve to be rendered using the present invention may be derived by applying an affine transformation (and in particular, a transformation consisting of only translation, rotation and/or uniform scaling components) to a previous curve.

It is also possible that the stroked curve to be rendered is a portion of another or initial curve as initially defined or indicated by, for example, the application that requires the curve to be drawn.

For example, as will be appreciated by those skilled in the art, an application will often require a stroked path comprising any number of suitable line segments connected end-to-end, such as, although not limited to, any one or more of: a straight line; a quadratic bezier curve; a cubic bezier curve; an elliptical arc; and a (non-uniform rational) B-spline, to be rendered. Each such line segment may then form an "input" stroked curve that is rendered using the techniques of the present invention.

In one such embodiment, each segment making up the whole stroked path can be processed and rendered using the technique of the present invention (i.e. with each line segment of the stroked path being individually processed and rendered in the manner of the present invention). Alternatively, in another embodiment, only a portion of the stroked path, e.g. one or more of the line segments forming the stroked path, is processed and rendered using the technique of the present invention, and one or more other rendering techniques are used to render the remainder (e.g. the other line segments) of the stroked path.

In a particularly preferred embodiment, the present invention comprises processing a set of one or more, and preferably a plurality of, stroked curves for display in the manner of the present invention, wherein the set of curves together, or in some embodiments in combination with other line segments, form an overall stroked path or object to be displayed, such as, and preferably, a character (e.g. letter) of a font. In other words, each of the one or more stroked curves in the set will form, e.g., a segment of the overall path or object, and each of the one or more stroked curves will be rendered and processed in the manner of the present invention.

It is equally contemplated that the stroked curve to be rendered using the present invention may be derived by sub-dividing an initial curve that is defined in user space.

For example, the Applicants have recognised that certain curves, such as cubic curves with self-intersections or cusps, and curves that self-overlap (i.e. curves that bend to such an extent that the stroked curve overlaps itself—one region of the stroked curve overlaps (encroaches into) another region of the stroked curve), may be unable to be processed directly to a sufficient accuracy using the techniques of the present invention. It has been recognised, however, that such curves may be able to be rendered using the techniques of the present invention if such an initial curve is first divided into a plurality of more suitable curve sections or segments, each of which is then rendered individually.

Thus, in a particularly preferred embodiment, the present invention further comprises a step of or means for sub-dividing a stroked curve defined in user space into a plurality of stroked curved segments, with one or more of the stroked curve segments then being processed and rendered in the manner of the present invention. A determination as to the appropriate manner in which to sub-divide a stroked curve is preferably made by the graphics processing system based on one or more predefined criteria, such as a desired trade-off between performance (e.g. the time taken to render the stroked curve) and quality (e.g. the quality of the stroked curve in its rendered form).

Accordingly, it should be noted that references to the "input stroked curve to be rendered for display" herein are intended, unless the context requires otherwise, to refer to the curve that is to be subjected to the particular processing of the present invention, and that that curve may be, for example: the curve as initially defined, e.g. by the application in question; a portion of a curve or path as initially defined, e.g. by the application in question; or a curve derived from or related to the initially defined curve, such as a sub-section of that curve.

The projection of the input stroked curve to be displayed as defined in user space to a surface space representation in order to display the stroked curve may be done in any desired and suitable manner, for example as is already known in the art. Thus, this may be, and preferably is, done by projecting the stroked curve as defined in user space into the surface space using (implementing) an appropriate "user-to-surface" space transformation. This "user-to-surface" transformation is preferably input to or indicated to the graphics processing system along with the stroked curve to be rendered (at the same time or at different times), as is known in the art. (In other words, the user-to-surface transformation is not determined by the graphics processing system, but is instead input or indicated to the system as a predefined transformation indicating the mapping needed to project the stroked curve as defined in user space to its desired form in the surface space.)

Once a transformation (projection) into surface space of the stroked curve to be displayed has been generated, then one or more, and typically a plurality of, sampling points in surface space are, in effect, tested against the stroked curve as it appears in surface space (but using the technique of the present invention)

The sampling points in the surface space that are, in effect, tested against the curve to be rendered may take any desired and suitable form, and may be derived and generated as desired and in any suitable fashion. This may depend, for example, upon the particular mechanism by which the graphics processing system operates to render images for display.

For example, in the case of a ray-casting system, each sampling point could and preferably does correspond to a "ray", and each ray (sampling point) would then be tested against the projected form of the stroked curve in the manner of the present invention. (As is known in the art, ray-casting is a technique which starts from each pixel on the screen and traces the path ("ray") from the viewer's eye, through that pixel and into the scene to determine what is hit (and hence what the viewer sees). Thus each ray, in effect, defines a sampling point to be tested.)

On the other hand, in the case of a polygon-rasterisation based graphics processing system, the sampling points may be, for example, and preferably are, generated by firstly generating one or more primitives that cover the projected stroked curve in the surface space, and then rasterising that primitive or primitives (as is known in the art) to generate the sampling points for testing against the stroked curve in the manner of the present invention.

In this case, the present invention would thus, in a particularly preferred embodiment, further comprise steps of or means for generating one or more primitives that cover the projected stroked curve in the surface space; and for each of one or more sampling points within the one or more primitives in the surface space, then determining a corresponding sampling position in the projected space (which is then tested against the projected form of the stroked curve in the manner of the present invention).

It should also be noted here that while it would not be necessary in the case of a ray-casting system to generate, for example, a bounding primitive that covers the projected stroked curve in the surface space when generating the sampling points to be tested, it would, for example, be possible to first generate a bounding primitive and to then only test in the manner of the present invention those rays (sampling points) that intersect the bounding primitive, if desired. Indeed, this may facilitate an improved implementation of the present invention in a ray-casting system, as it may be more efficient to first test a ray against a bounding primitive for a curve, and then only test the ray against the curve "itself" if it is found that the ray (sampling point) first intersects the bounding primitive.

Where one or more graphics primitives that cover the stroked curve as it appears in surface space are generated, then those one or more graphics primitives can be generated and defined using any suitable and desired techniques, such as by defining a bounding box or boxes that cover the stroked curve as it appears in surface space and/or by defining a bounding polygon that tightly fits to the ends of the stroked curve as it appears in surface space, i.e. at its start and end (control) points.

The sampling points within the primitive(s) in surface space (which will, as will be appreciated by those skilled in the art, ultimately be shaded appropriately to display the curve) are then mapped to corresponding sampling positions (locations) in a "projected" space. In other words, each sampling point in surface space to be assessed for displaying the stroked curve (e.g., and preferably, each (appropriate) sampling point within the generated primitive or primitives that cover the stroked curve in surface space) is mapped to an appropriate corresponding sampling position in a projected space (which projected space sampling positions will then be tested against a projected form of the stroked curve in the projected space that corresponds to the stroked curve to be displayed (as will be discussed further below)).

The corresponding sampling position in the projected space to a sampling position in surface space can be determined in any suitable or desired manner. This may depend, e.g., on the nature of the "projected" form of the stroked curve to be displayed that the sampling position in the projected space is to be tested against.

In a particularly preferred embodiment, the corresponding sampling position in the projected space to a sampling position in surface space is determined by first mapping the sampling point in surface space to a corresponding location in user space, and then mapping the corresponding location in user space to a corresponding location in the projected space that the projected form of the stroked curve is defined in.

In this arrangement, the sampling point in surface space is preferably mapped to a corresponding location in user space using the inverse of the transformation used to project the received stroked curve to the surface space (i.e. using the inverse of the "user-to-surface" transformation). (As discussed above, the "user-to-surface" transformation, whose inverse will be used as part of this process, will be provided or indicated to the graphics processing system. The appropriate inverse "user-to-surface" transformation (i.e. the "surface-to-user" transformation) will therefore straightforwardly be known to or derivable by the graphics processing system.)

The mapping of the corresponding location in user space to a corresponding location in the projected space is then preferably carried out, at least in part, by applying another transformation to the sampling position, which transformation, in effect, transforms the sampling position from its initial position in user space to its equivalent position in the projected space (or at least to a transformed position from which the corresponding position in the projected space can straightforwardly be determined).

This latter transformation will be referred to herein as the "user-to-projected" transformation, and as will be discussed in more detail below, is, in effect, the transformation that must be applied as all or part of the process when converting the stroked curve as defined in user space to its projected form in the projected space.

In a particularly preferred embodiment (and as will be discussed in more detail below), this "user-to-projected" transformation is intended to be applied in a homogeneous space (to a homogeneous space representation of the "user space" stroked curve (and sampling points)), and so in a particularly preferred embodiment, the step of or means for mapping a sampling point in user space to a corresponding position in the projected space comprises steps of or means for, first placing the sampling point in user space into a "homogeneous user space", applying a (the appropriate) user-to-projected transformation to the sampling point in the homogeneous user space (such that the sampling point can then be considered to be in a "homogeneous projected space"), and then projecting the so-transformed sampling point in homogeneous projected space into the projected space by applying an appropriate perspective division to the sampling point in the homogeneous projected space.

As discussed in more detail below, each given curve will typically have its own particular "user-to-projected" transformation, and the user-to-projected transformation to be used for a given curve can either be calculated directly from the information relating to the curve to be displayed once it has been received by the graphics processing system, or it could be predetermined and stored in advance for use as and when needed.

Most preferably, one or more, and preferably a plurality of predefined "user-to-projected" transformations for given defined curves are stored in a data store (memory) within or accessible by the graphics processing system, preferably together with an indication of the curve or curves to which they apply. The "user-to-projected" transformation for a particular curve to be rendered is preferably then retrieved (looked-up) from the data store (memory) as and when required during the rendering process (e.g. when mapping the relevant sampling points to the projected space).

This is possible and desirable because the Applicants have recognised, as discussed herein, that the present invention has particular benefits in rendering stroked curves that repeatedly need to be rendered. For example, those stroked curves that form a letter, number, symbol, etc, or a portion thereof, of a particular font used in, or with, an application (e.g. in electronic documents) and/or those stroked curves that form a label, or a portion thereof, on a map in a satellite navigation (satnav) application, will typically need to be rendered again and again is use.

This means that the stroked curves that can and will be rendered using the present invention can be known in advance, i.e. before the start of any rendering operations. Thus, the "user-to-projected" transformation required by each such curve can be determined in advance, and stored for subsequent use by the graphics processing system, and the appropriate transformation, e.g., either supplied or indicated to the graphics processing system, e.g. along with the information concerning the stroked curve to be displayed, or looked up from a data store by the graphics processing system once the stroked curve to be displayed has been received.

Accordingly, in a particularly preferred embodiment, a predefined or predetermined transformation is used when mapping the sampling point in user space to a corresponding sampling position in the projected space for testing against the projected form of the stroked curve.

Similarly, in a particularly preferred embodiment, the step of or means for mapping a sampling point in surface space to a corresponding sampling position in the projected space includes using one or more predefined or predetermined transformations, preferably in the form of the inverse of a predefined user space to surface space (user-to-surface) transformation, and then a predefined "user-to-projected" transformation.

As will be appreciated by those skilled in the art, although the "user-to-surface" and "user-to-projected" transformations have been discussed separately above, these transformations could in practice either be applied separately or combined into a single "surface-to-projected" transformation.

Once the corresponding sampling position in the projected space has been determined, then, as discussed above, this sampling position is tested against a projected form of the stroked curve to be displayed in the projected space.

The Applicants have found that using a projected form of the user space curve as the form of the stroked curve that is used when testing the sampling positions allows the process (and in particular the predetermined information in relation to the curve that is used in the process of the present invention) to be invariant for at least some forms of variation in, or transformation of, the corresponding stroked curve as defined in user space. For example, it can allow the same predetermined information to be used for different forms (e.g. widths, scales, orientations, etc) of the corresponding stroked curve as defined in user space, and can also mean that it is not necessary, e.g., to derive and store a different set of predetermined information relating to a given stroked curve for each transformation to surface space that the stroked curve defined in user space may be subjected to.

The projected space that the projected form of the stroked curve is defined in (and that the sampling positions are tested in) may take any suitable and desired form, e.g., depending on the nature of the projected form of the stroked curve and/or of the predetermined information to be used in relation to that curve.

It should be noted here that references herein to the projected space in which the sampling positions are tested against the projected form of the stroked curve to be displayed are intended simply to indicate, unless the context otherwise requires, the space in which the particular form of the stroked curve that the predetermined "extent" (e.g. width) estimating information relates to is defined in and are, in particular, not intended to otherwise imply any particular properties or requirements of the projected space.

In a preferred embodiment, the projected space of the present invention is a different "space" to the "user space" and the "surface space" (and to the "homogeneous user space" and the "homogeneous projected space") that are also considered in the present invention. It will, however, be understood by those skilled in the art that this is not essential, and in certain situations the projected space may, e.g., be the same as (equivalent to) the user space.

In a preferred embodiment, the projected space is two-dimensional, as this will then allow it to "match" the typically two-dimensional user space that stroked curves to which the present invention is particularly suited to (such as for fonts) will be defined in relation to. The projected space thus preferably has two, preferably orthogonal, axes that the projected form of the stroked curve to be displayed (and the sampling positions in the projected space) may be defined in relation to. In a preferred embodiment, the projected space is a Cartesian co-ordinate space, in which case the two axes of the projected space directions will be the x and y axes in that space.

Thus, in a particularly preferred embodiment, the projected form of the stroked curve that is used in the present invention is a projection of the stroked curve in user space into a defined, two-dimensional, projected space.

The projected form of the "user space" stroked curve in the projected space that is used as the projected form of the stroked curve in the present invention may take any suitable and desired form, although it should be of a form such that it can be represented by information allowing its extent in a defined (e.g., and preferably, a "width") direction for one or more points along its length to be estimated (since the present invention uses predetermined information of this form to test the sampling points in the projected space against the projected form of the stroked curve).

However, the Applicants have recognised that, as will be discussed further below, certain projected forms of a stroked curve will be particularly advantageous in the context of the present invention.

For example, the Applicants have recognised that it is beneficial for the projected form of the stroked curve to be such that the end points of the stroked curve lie at particular, preferably predefined, locations, and most preferably lie on the same axis.

Thus, in a particularly preferred embodiment, the projected form of the stroked curve is a form of the stroked curve that places the end points of the curve at defined locations in the projected space. Most preferably the end points of the projected form of the stroked curve both lie on the same axis in the projected space, such as, and preferably, on the x-axis.

As will be discussed further below, it has further been recognised that in order for the predetermined information to be used in relation to the projected form of the stroked curve in the present invention to be able to provide a more accurate representation of the stroked curve that is to be displayed (and thus more accurate rendering of that curve), it will be beneficial to orient the normals on the centre curve of the stroked curve in user space to be parallel to each other so far as is possible in the corresponding projected form of the stroked curve, and most preferably to be parallel to the defined (e.g. "width") direction (e.g., and preferably, as will be discussed further below, to an axis direction (such as, and preferably, the y-axis)) in the projected space that the extent of the projected stroked curve will be estimated for.

In essence, this is because, as will be discussed below, if the user space normal to the curve is parallel to the defined, e.g. width (e.g. axis), direction in question in the corresponding projected form of the stroked curve, the extent of the projected form of the stroked curve in that direction should then correspond, subject to any scaling factor, to the user space defined stroke width (which will be a known parameter). This will then allow, as will be discussed further below, the predetermined information that is used in relation to the projected form of the stroked curve in the present invention to provide a more accurate estimate of the extent (width) of the stroked curve at the relevant point. Thus it is preferable to align the user space normals to the curve as they appear in the corresponding projected form of the stroked curve so as to be as parallel to the relevant defined, e.g. width (e.g. axis), direction as possible.

While ideally each and every user space normal in the corresponding projected form of the stroked curve would be parallel to the relevant defined, e.g. width (e.g. axis), direction in projected space, this may not easily be possible, and so the Applicants have recognised that it is preferred that at least two of the user space normals are arranged to be parallel to each other and most preferably parallel to a desired direction, as if this is done, the other normals should be closer to that direction as well, particularly if this is done in respect of the normals for the end points of the curve.

Thus, in a particularly preferred embodiment, the projected form of the stroked curve is a form of the stroked curve in which the normal vectors associated with the end points of the corresponding stroked curve in user space are configured so as to be parallel to each other, and most preferably so as to lie along (be parallel to) a particular, preferably predetermined or selected, direction in the projected space (which direction is preferably the defined (e.g. "width") direction in the projected space for which the predetermined information allows the extent of the projected form of the stroked curve to be determined). As will be discussed further below, these normal vectors preferably lie parallel to an axis, such as, and preferably, the y-axis, of the projected space, in the projected form of the stroked curve.

In a particularly preferred embodiment, the projected form of the stroked curve is generated from the stroked curve as defined in user space by applying, inter alia, a particular (and suitable) transformation to the stroked curve. In other words, the projected form of the stroked curve is, at least in part, a transformed version of the stroked curve as defined in user space.

This transformation will be the "user-to-projected" transformation discussed above, and that is preferably used when mapping the sampling positions from the user space to the projected space as discussed above.

It may be that the "user-to-projected" transformation can be applied directly to the stroked curve in user space to generate the projected form of the stroked curve. However, as discussed above, in a particularly preferred embodiment, this transformation is intended to be performed in a homogeneous space, and so the process of generating the projected form of the stroked curve from the stroked curve as defined in user space will additionally involve first placing the curve in a "homogeneous user space" (generating a homogeneous space representation of the stroked curve as defined in user space) and, after the user-to-projected transformation has been applied to the curve in homogeneous user space to form a curve in a "homogeneous projected space", then subjecting the transformed curve in homogeneous projected space to a perspective division to project the curve into the projected space (into its projected form).

Thus, in a particularly preferred embodiment, the projected form of the stroked curve can be (and preferably is) generated by first placing the stroked curve as defined in user space (which user space is, e.g., and preferably, a two-dimensional space) into a homogeneous user space (e.g., and preferably, a three-dimensional space). The curve in the homogeneous user space is preferably then transformed (using a "user-to-projected" transformation), and the so-transformed curve in homogeneous projected space then subjected to a perspective division (e.g. in a manner known in the art) to project it into the projected space (such that the curve is again represented in a space of the same dimension as the user space), to generate the projected form of the curve in the projected space.

In this case, the "user-to-projected" transformation will be the transformation that is applied to the curve in the homogeneous user space (i.e. the user space form of the curve when placed in a homogeneous space).

The Applicants have recognised that it is advantageous if the mapping of the stroked curve in user space to its corresponding projected form in the projected space is done via a homogeneous space, i.e. one that has an extra dimension than the user space. For example, converting the stroked curve in user space into its desired projected form via a homogeneous space is beneficial as it can facilitate the use of various mathematical operations that can be associated with the conversion process. This is similar, for example, to the use of homogeneous coordinates in conventional computer graphics (e.g. perspective transformations) wherein three-dimensional coordinates in one space are represented as four-dimensional coordinates in a homogeneous space.

The "user-to-projected" transformation used when generating the projected form of the stroked curve can take any suitable and desired form, depending, e.g., on the desired projected form of the stroked curve. However, for the reasons discussed above, the "user-to-projected" transformation preferably transforms the stroked curve into a particular corresponding projected form of the stroked curve as discussed above (or, where the transformation is to be applied to a homogeneous user space representation of the curve, transforms the curve into a form which when subjected to a perspective division will provide a particular projected form of the curve as discussed above (in which case, the "user-toprojected" transformation that is applied in the homogeneous space should be such as to ensure that the curve will have the desired form in the projected space (i.e. after the perspective division))).

Thus, as discussed above, in a preferred embodiment, the "user-to-projected" transformation comprises a transformation that will result in at least two points on the stroked curve as defined in user space being mapped to predetermined or predefined locations in the projected space (e.g. following a perspective division, where that is to be done following the transformation).

Thus, the transformation preferably takes a first point on (the centre curve of) the stroked curve (preferably one end point of the curve) and maps it to a first predefined location (following a perspective division, where that is to be done following the transformation), and also takes a second point on (the centre curve of) the stroked curve (preferably the other end point of the curve) and maps it to a second predefined location (following a perspective division, where that is to be done following the transformation). Most preferably, the user-to-projected transformation maps the start and end control points of the curve onto (separate) points on the same axis, such as, and preferably, the x-axis (following a perspective division, where that is to be done following the transformation).

Similarly, as discussed above, the "user-to-projected" transformation preferably also, or in some embodiments instead, is such as to make the normal vectors of the stroked curve as defined in user space following their transformation (and following a perspective division, where that is to be done following the transformation) more parallel to each other, and preferably so that they will be more parallel to the defined (e.g. "width") direction (preferably an axis direction) in the projected space (again, following a perspective division, where appropriate).

This is preferably achieved, as discussed above, by defining the "user-to-projected" transformation such that the normal vectors associated with two points on the stroked curve, and preferably the normal vectors associated with the two end points of the curve, are made exactly parallel (and preferably parallel to the desired, e.g. "width" (e.g. axis), direction) following the transformation (and following a perspective division, where that is to be done following the transformation). Whilst following such a transformation the other normal vectors as they appear in projected space may not become exactly parallel, the Applicants have found that such a transformation should still result in them being orientated so as to be in an improved degree of alignment.

Thus, in a preferred embodiment, the "user to projected" transformation that is used as all or part of the process of projecting the stroked curve in user space to its corresponding projected form in the projected space for use in the present invention comprises a transformation that changes the relative orientation of the normal vectors associated with two or more points on the stroked curve, e.g. and preferably, the start and end points of the stroked curve. In a particularly preferred embodiment, the transformation is a transformation that changes the relative orientation of those normal vectors such that they are parallel to each other (and pointed in the same direction) in the transformed form of the curve, and, most preferably, such that those normal vectors will point along the defined (e.g. width) direction (e.g. an axis direction) in the projected space for which the predetermined information allows the extent of the projected form of the stroked curve to be estimated.

Accordingly, in the preferred embodiment of the present invention in which the projected space is defined in relation to orthogonal x and y axes, the "user-to-projected" transformation is preferably such as to reorient the normal vectors associated with the start and end control points of the stroked curve in user space such that in the corresponding projected form of the stroked curve those normal vectors are orientated to be parallel to each other and to one of the axes in the projected space, e.g. and preferably, the y-axis.

(As will be understood by the skilled person, a "user-to-projected" transformation that changes the orientation of the normal vectors of two or more points of the stroked curve as discussed above will cause the angle of the normal vectors at each point on the curve to be changed from 90° (with respect to the tangent of the curve at the particular point) to a non-90° angle in the transformed form of the stroked curve, the angle typically being different for each point on the curve. However, whilst these vectors in the transformed form of the stroked curve may therefore not be "normal vectors" in a conventional sense, i.e. they will not be normal to the transformed form of the stroked curve, they will continue to be referred to herein as the "normal vectors" for convenience. Thus, the vectors in the, e.g., transformed (and projected) forms of the stroked curve that are referred to as "normal vectors" are therefore, unless the context requires otherwise, those vectors that correspond to the normal vectors in the "user space" form of the stroked curve.)

The "user-to-projected" transformation therefore preferably comprises: a transformation that maps at least two points on the stroked curve to predetermined or predefined locations; and/or a transformation that changes the relative orientation of the normal vectors associated with two or more points on the stroked curve such that they are parallel in the corresponding transformed stroked curve (in both cases after a perspective division, if that is to be done as part of the "projected" curve generation process). In a particularly preferred embodiment, the user-to-projected transformation comprises a transformation that performs both of these actions, and preferably with respect to the same two or more points on the stroked curve in user space.

The above "user-to-projected" transformation that will be used when mapping the stroked curve in user space to its corresponding projected form for use in the present invention in the projected space can, for example, be represented as an affine transformation (component) and a projective transformation (component). The affine component of the transformation is used to satisfy the condition that at least two points on the stroked curve are mapped to predetermined or predefined locations by the transformation, whilst the projective component of the transformation is used to satisfy the condition that the user space normal vectors of the at least two points on the curve are parallel in the projected form of the curve (and preferably parallel to a given direction) (at least following a perspective division where the transformation is to be performed in a homogeneous space). As will be appreciated, however, the transformation can be represented (and calculated) in any suitable and desired manner.

Where a "user-to-projected" transformation can be (is) used to generate the projected form of the stroked curve, then as discussed above, it is that "user-to-projected" transformation that is preferably used for (as all or part of) the process of mapping the sampling points in surface space to corresponding sampling positions in the projected space.

Thus, in a particularly preferred embodiment, as discussed above, a plurality of such user-to-projected transformations are derived and stored for respective stroked curves that it is desired to be able to render (and then used, as appropriate, when mapping the sampling positions from user space to the projected space when rendering the respective stroked curves). As will be appreciated by those skilled in the art, these transformations can readily be derived in any suitable and desired manner for the or each stroked curve as defined in user space.

In the present invention, the testing of the sampling positions in the projected space against the projected form of the stroked curve in the projected space to see if they fall within the projected form of the stroked curve in the projected space is not carried out by testing the sampling positions against the projected form of the stroked curve directly, but instead by using predetermined information to estimate the extent of the projected form of the stroked curve in a defined direction at a position along the length of the projected form of the stroked curve corresponding to the sampling position in question.

The predetermined information that is used for estimating the extent in the defined direction of the projected form of the stroked curve that is used in the present invention may take any suitable and desired form, i.e. may take any form that allows the relevant extent of the projected form of the stroked curve to be estimated, either using the predetermined information alone, or in combination with other information (as will be discussed further below).

It should be noted here that the reference to the predetermined information as allowing the extent of the projected form of the stroked curve in a defined direction to be estimated is intended to indicate that the predetermined information allows the extent of the curve in a given direction to be estimated. The defined direction may be any suitable and desired direction in relation to the curve, but most preferably is a direction that is generally across the "width", as against along the "length", of the curve (i.e. the defined direction is not along the length of the curve, but generally can be considered to be across the width of the curve). Thus, in a particularly preferred embodiment, the predetermined information used in the present invention allows the extent in a width direction of the projected form of the stroked curve to be estimated.

However, it should also be noted that defining the direction as being a "width" direction is not intended to require that the predetermined information allows the extent of the curve in a direction precisely normal to the centreline of the curve to be estimated (this may be the case for some points on the curve, but, as will be discussed further below, typically will not be the case for all points along the curve). Nor, indeed, is it intended to require that the stroke width as defined in user space can be estimated using the predetermined information.

Rather, as will be discussed further below, the intention is that an estimate of the extent of the stroked curve in a direction that is generally across its width can be estimated, since, as will be discussed further below, this has been found to facilitate efficient, and sufficiently accurate, rendering of at least some forms of stroked curve.

The defined (e.g. width) direction that the predetermined information relates to preferably does not vary along the curve, i.e. there is preferably a single defined (e.g. width) direction and the predetermined information allows the extent of the curve in that single defined direction at points along the length of the curve to be determined.

Thus, in a preferred embodiment, the defined (e.g. width) direction that the predetermined information relates to is the same direction for all points along the projected form of the stroked curve.

It should similarly be understood that references to positions along the "length" of the projected form of the stroked curve are intended to refer to positions extending generally along the length, as distinguished from across the width, of the projected form of the stroked curve, rather than to imply any further restrictions or requirements on those positions.

In other words, in general, in its projected form, the stroked curve will be able to be considered to, in effect, generally extend in a given direction and it is this direction that will be the "length" direction in relation to the curve. The "width" direction is then intended to be a direction that is generally across or perpendicular to that length direction, although it need not be (but can be) exactly perpendicular to the "length" direction.

In one preferred embodiment, the "length" direction is taken as the (straight) line joining the start and end points of the projected form of the stroked curve.

In a particularly preferred embodiment, the defined ("width") direction is taken as a direction that is approximately parallel to the normals of the stroked curve in its projected form (and preferably parallel to the normals at the start and end points of the stroked curve in its projected form). The "length" direction is then a direction that is generally perpendicular to, and in a preferred embodiment perpendicular to, that direction.

It should also be noted here that while the extent of the projected form of the stroked curve in the defined (e.g. width) direction (e.g. in the y-direction) at a point along the curve as used and defined in the present invention can effectively be thought of as representing the "width" of the curve in that direction at that point (and will, in effect, allow the "width" of the curve in that direction at that point to be estimated), this "extent" indication (e.g. the "y-extent" of the curve) will only correspond to the user space defined stroke width w of a stroked curve if the "extrusion" direction of the projected form of the stroked curve is perpendicular to the defined direction (e.g. the y-axis) at that point (and subject to any scaling factor). Thus, the present invention does not simply store and use the user space stroke width at each point along the "length" direction of the curve, but rather uses a value (or values) that allows the extent of the curve in the appropriate direction at each point to be estimated.

In a particularly preferred embodiment, the defined (e.g. "width") direction that the predetermined information allows the extent of the projected form of the stroked curve to be estimated in respect of is parallel to one of the axes of the projected space. Thus, in a particularly preferred embodiment, the predetermined information allows the extent of the projected form of the stroked curve in a direction parallel to one of the axes of the projected space to be estimated (and thus the defined (e.g. "width") direction referred to in the present invention will be the direction of that axis). In this case, the corresponding direction along the "length" of the projected form of the stroked curve is preferably parallel to another axis of the projected space.

Thus, in a particularly preferred embodiment, the present invention comprises a step of or means for using predetermined information to estimate the extent in a first axis direction (which will be the defined (e.g. "width") direction) in the projected space of the projected form of the stroked curve at a position along a second axis direction in the projected space corresponding to the position of the sampling point in question in that second axis direction. In the preferred case of the projected space being two dimensional and having orthogonal x and y axes, the first axis direction (the defined "width" direction) may, e.g., and preferably, be along the y axis and the second axis direction (the "length" direction) along the x axis (or vice-versa).

Thus, according to a third aspect of the present invention, there is provided a method of rendering a stroked curve for display in a graphics processing system, the method comprising:

receiving an input stroked curve defined in user space to be displayed;

projecting the received stroked curve using a received transformation into a surface space for display;

for each of one or more sampling points in the surface space:

determining a corresponding sampling position in a projected space;

using predetermined information to estimate the extent in a first axis direction of the projected space of a projected form of the stroked curve to be displayed in the projected space at a position along a second axis direction of the projected space corresponding to the position along the second axis direction of the projected space of the sampling position in the projected space;

using the estimated extent in the first axis direction of the projected space of the projected form of the stroked curve to be displayed to determine whether the sampling position in the projected space falls within the projected form of the stroked curve or not; and assigning data for rendering the received stroked curve for display to the sampling point in surface space that corresponds to the sampling position in the projected space in accordance with said determination.

According to a fourth aspect of the present invention, there is provided an apparatus for rendering a stroked curve for display in a graphics processing system, the apparatus comprising:

means for receiving an input stroked curve defined in user space to be displayed;

means for projecting the received stroked curve using a received transformation into a surface space for display; and means for, for each of one or more sampling points in the surface space, determining a corresponding sampling position in a projected space;

means for using predetermined information to estimate the extent in a first axis direction in the projected space of a projected form of the stroked curve to be displayed in the projected space at a position along a second axis direction of the projected space corresponding to the position along the second axis direction of the projected space of a sampling position in the projected space;

means for using the estimated extent in the first axis direction of the projected space of the projected form of the stroked curve to be displayed to determine whether a sampling position in the projected space falls within the projected form of the stroked curve or not; and means for assigning data for rendering the received stroked curve for display to a sampling point in surface space that corresponds to a sampling position in the projected space in accordance with said determination.

As will be appreciated by those skilled in the art, these aspects of the invention may and preferably do include any one or more or all of the preferred and optional features of the present invention described herein, as appropriate. Thus, for example, the first axis direction is preferably along the y-axis in the projected space, and the second axis direction is preferably along the x-axis.

It will be appreciated that in these arrangements, the projected form of the stroked curve will effectively be defined in terms of its extent in one axis direction (e.g. the y-direction) at various points along the extent of the curve in another axis direction (e.g. the x-direction).

In other words, rather than defining the stroked curve in terms of a centre path and a fixed perpendicular stroke width along that path (which, as discussed above, will normally be the way that such a curve is defined in user space), the present invention will use, in these embodiments at least, a definition of a stroked curve that allows the extent of the curve in one axis direction at a point or points along the curve in another axis direction to be determined.

The Applicants have recognised that it is possible to represent and define stroked curves in this manner, and for such definitions of the stroked curves to be useful for rendering stroked curves and to be able to provide sufficiently accurate rendering results in practice, at least for some forms of stroked curve.

The present invention thus also extends to the use of such a definition of a stroked curve.

Thus, according to a fifth aspect of the present invention, there is provided a method of defining a stroked curve for use in a graphics processing system, the method comprising defining the curve in terms of information for use to estimate the extent of the curve in one axis direction of a given space for a plurality of positions along another axis direction of the given space.

According to a sixth aspect of the present invention, there is provided an apparatus for defining a stroked curve for use in a graphics processing system, the apparatus comprising means for defining a stroked curve in terms of information for use to estimate the extent of the curve in one axis direction in a given space for a plurality of positions along another axis direction of the given space.

According to a seventh aspect of the present invention, there is provided a data structure for defining a stroked curve for use in a graphics processing system, the data structure comprising an array of data values for use to estimate the extent of a stroked curve in one axis direction in a given space for a plurality of positions along another axis direction of the given space.

As will be appreciated by those skilled in the art, these aspects of the invention can and preferably do include one or more or all of the preferred and optional features of the invention described herein, as appropriate. Thus, for example, the given space is preferably two-dimensional, and the two axis directions are preferably orthogonal, and are preferably along the x and y axes (or vice-versa) in a Cartesian space.

The predetermined "extent estimating" information used in the present invention can allow the extent of the projected form of the stroked curve in the relevant defined (e.g. width) direction at a location along the length of the projected form of the stroked curve to be estimated in any suitable and desired fashion.

In a particularly preferred embodiment, the predetermined information allows the range of positions in the defined, e.g., width (e.g. axis), direction that the projected form of the stroked curve covers to be estimated. (This range of positions can then be tested against the sampling point's position in the projected space to see if the sampling point falls within the curve or not.)

The range of positions in the defined, e.g. width, direction covered by the projected form of the stroked curve at a particular position along its length can be estimated in any suitable and desired manner (with the predetermined information being configured accordingly).

In a particularly preferred embodiment, the predetermined information can be and preferably is used to estimate maximum and minimum position values in the defined direction that the projected form of the stroked curve covers.

In a particularly preferred embodiment this is done by using the predetermined information to estimate the positions of the outer boundaries (edges) of the curve (to each side of the centreline of the curve) in the relevant defined, e.g., width (e.g. axis), direction.

For example, the predetermined information is preferably used to determine a first location along the defined, e.g. width (e.g. axis), direction that represents an estimate of a first (e.g. the upper) outer boundary of the projected form of the stroked curve, and a second location along the defined, e.g. width (e.g. axis), direction that represents an estimate of the other (e.g. the lower) outer boundary of the projected form of the stroked curve.

The range of positions covered by the projected form of the stroked curve in the defined, e.g. width, direction will then be the range of positions between these estimated boundaries of the curve.

As will be appreciated, whilst the distance along the defined, e.g. width, direction from the centre line of the projected form of the curve to one (e.g. the upper) outer edge (boundary) of the curve at a given point along the curve may be the same as the distance along the width direction from the centre line to the other (e.g. the lower) outer edge of the curve at that point, at least in the case where the projected form of the stroked curve is generated via a homogeneous space, it may more commonly be the case that the distances from a given point on the centreline of the curve to each edge in the projected form of the curve will differ, due to the perspective division that occurs when the stroked curve as it appears in the homogeneous projected space is projected into the projected space.

Thus it is preferred to estimate the position of each edge (outer boundary) of the curve independently, rather than simply estimating the position of one boundary and then taking that position to each side of the curve (above and below the curve) (although this could be done, if desired).

Thus, in the case of using a projected space having x and y axes, for example, the predetermined "extent estimating" information preferably allows minimum and maximum y-values in the projected space covered by the curve at a given x-position to be estimated, which y-values will then represent an estimate of the position on the y-axis of the lower and upper outer boundaries (edges) of the projected form of the stroked curve at the point in question.

The predetermined "extent-estimating" information may in itself allow an estimate of the extent of the projected form of the stroked curve in the defined, e.g. width, direction to be determined. However, in a preferred embodiment, the predetermined information is to be used together with other information to obtain an estimate of the relevant extent of the projected form of the stroked curve.

In a particularly preferred embodiment, the predetermined information relating to the projected form of the stroked curve is to be used (and is used) together with the stroke width in user space of the curve to be displayed (which, as discussed above, will be known to the graphics processing system) to estimate the extent of the stroked curve in the relevant defined, e.g. width (e.g. axis), direction.

As will be discussed further below, using predetermined information that is to be used in conjunction with the stroke width in user space of the curve to be displayed is particularly advantageous, because it allows the predetermined information to be used for the stroked curve in question, irrespective of the desired stroke width in user space (since the desired stroke width will be taken into account when estimating the extent of the projected form of the stroked curve). In other words, this allows the predetermined information to be invariant to changes in the desired user space stroke width of the curve that the predetermined information corresponds to.

(In this case the predetermined information and the user space stroke width for the stroked curve (as received by the graphics processing system) will, in effect, be used in combination to determine the extent of the "projected" form of the stroked curve that the sampling positions in the projected space are tested against.)

The predetermined "extent estimating" information to be used when estimating the extent of the projected form of the stroked curve in the defined direction can take any suitable and desired form that will allow, for example, the range of positions covered by the projected form of the stroked curve in the projected space at the relevant position along the length of the projected form of the stroked curve to be estimated.

In a particularly preferred embodiment, and as will be appreciated from the discussions herein, where the transformations to the projected form of the stroked curve are carried out via a homogeneous space, the process of using the predetermined "extent estimating" information can and preferably does comprise, determining the centrepoint and (adjusted—as will be discussed below) unit normal of the curve in homogeneous projected space, and using that together with the user space stroke width to estimate the position of the curve's boundary in the homogeneous projected space, and then projecting that estimated curve boundary point into the projected space by perspective division and testing the (mapped) position of the sampling point in projected space against the so-estimated curve boundary point in the projected space (and then repeating this for the other edge (boundary point) of the curve).

Thus, in a particularly preferred embodiment, the predetermined "extent estimating" information that is to be used to estimate the extent of the projected form of the stroked curve in the defined (e.g. width) direction comprises information that can be used to estimate the component at the respective position along the length of the homogeneous projected space form of the stroked curve in the relevant (e.g. width) direction in the homogeneous projected space of the unit normal vector of the stroked curve in user space as it appears in the homogeneous projected space form of the stroked curve.

As will be discussed further below, the Applicants have recognised that the distance of the outer edge of the stroked curve from the curve's centreline can be estimated by scaling the relevant component of the (homogeneous projected space form of the) unit normal vector of the curve at the position in question by half the user space stroke width w (since scaling the unit normal vector by half the user space stroke width will extend the normal vector from the point on the centre line of the curve to a point on the curve's boundary).

Thus, the unit normal vector component information can be used together with the width of the stroked curve in user space (which will be known) to estimate the extent of the homogeneous projected space form of the stroked curve in the desired direction.

Moreover, if predetermined information that allows the relevant extent (component) of the unit normal vector is determined and used, that is advantageous because it allows that information to be used for all desired user space stroke widths of the particular curve in question (as against having, e.g., to determine and store a set of information for each different stroke width that it may be desired to render).

Furthermore, as will be discussed further below, the Applicants have recognised that if such an estimate of the distance along the relevant, e.g. width, direction of the stroked curve is "added" to the position of the centreline of the homogeneous projected space form of the stroked curve in the relevant, e.g.

width, direction, at that point, the boundary positions in the relevant direction covered by the homogeneous projected space form of the stroked curve can be estimated.

Thus, in a particularly preferred embodiment, the predetermined information that is used in relation to the projected form of the stroked curve also includes information that allows the position in the relevant direction (e.g. width) direction of the centreline of the homogeneous projected space form of the stroked curve at the relevant length position to be estimated (i.e. includes information to be used to estimate the position in the "width" direction of the centre-line of the homogeneous projected space form of the stroked curve).

This information can then be used, e.g., with the estimate of the component in the homogeneous projected space of the unit normal vector of the corresponding stroked curve in user space at that position, and with the stroked width in user space, to estimate the range of y values that the projected form of the stroked curve to be displayed would cover in the projected space, as discussed above.

Thus, in a particularly preferred embodiment of the present invention, the predetermined information to be used when estimating the extent of the stroked curve in a given direction in the projected space comprises information to be used to estimate the location of a point on the centreline of the homogeneous projected space form of the stroked curve, and information to be used to estimate the defined (e.g. width) direction component of the user space unit normal vector as in appears in the homogeneous projected space form of the stroked curve at that point on the homogeneous projected space form of the stroked curve.

The Applicants have further recognised that a more accurate estimate of the extent along the relevant, e.g. width, direction of the homogeneous projected space form of the stroked curve at a position along the length of the curve can be provided, as will be discussed further below, by applying an adjustment factor when estimating the component in the relevant direction of the unit normal vector of the curve. Such a more accurate estimate may achieve a better rendering quality, and may, for example, be desirable in particular when the width of the stroked curve to be rendered is relatively large.

Thus, in a particularly preferred embodiment, the predetermined "extent-estimating" information comprises information that allows an adjusted estimate of the component in the relevant direction of the homogeneous projected space form of the user space unit normal vector to the curve to be determined. Most preferably it, in effect, allows the component of the unit normal vector plus (or minus) an adjustment factor to be determined.

The adjustment to be made (and adjustment factor to be applied) in these arrangements can be selected and derived as desired. However, in a particularly preferred embodiment, and as will be discussed further below, it is based on or uses the tangent vector to the centreline of the curve at the relevant position along the length of the curve (and preferably the tangent vector as it appears in the homogeneous projected space where the process takes place via a homogeneous space).

Most preferably the adjustment (factor) in effect uses or takes account of the component in the relevant (e.g., width) direction of the unit tangent vector to the centreline of the curve at the relevant position along the length of the curve. As will be discussed further below, this can then be used to "adjust" the estimate of the corresponding unit normal vector component, to then provide a more accurate estimate of the relevant extent of the stroked curve.

Again, using predetermined information that uses the relevant component of the unit tangent vector is advantageous, because it then allows that information to be used for all desired user space stroke widths of the particular curve in question.

Thus, in a particularly preferred embodiment, the predetermined information to be used when estimating the extent of the projected form of the stroked curve in the defined, e.g. width, direction at a position along the length of the homogeneous projected space form of the stroked curve comprises information based on or relating to a unit normal vector of the stroked curve at the relevant position along the stroked curve, preferably together with information based on or relating to a unit tangent vector to the centreline of the curve at the relevant position along the stroked curve.

In a particularly preferred embodiment, the adjustment factor (component) depends on both the tangent vector and on the extent to which the "normal" vector deviates from the defined (width) direction in the projected space.

It will be appreciated that where the predetermined information to be used in the present invention is intended to allow the position of the centreline of the homogeneous projected space form of the stroked curve and the component of the user space unit normal vector in the homogeneous projected space form of the curve to be estimated, then the predetermined information will, in effect, relate to a projection of the centreline (path) of the corresponding stroked curve to be displayed into the projected space, and this will then be used together with the defined user space stroked width w of the stroked curve to be displayed to, in effect, "generate" the "actual" projected form of the stroked curve to be displayed that the sampling positions in the projected space are tested against.

The predetermined "extent-estimating" information itself can take any suitable form that allows the information relating to the projected form of the stroked curve to be estimated.

In a particularly preferred embodiment where, as discussed above, the projected form of the stroked curve is derived via a transformation that is carried out in a homogeneous space, the predetermined "extent-estimating" information comprises information that is derived in relation to the transformed form of the curve in the homogeneous projected space. In particular, the Applicants have recognised by deriving and storing predetermined information relating to the transformed form of the curve in the homogeneous projected space in such arrangements, it is still straightforwardly possible to derive the corresponding information discussed above for the projected form of the stroked curve in the projected space, since that information is derivable by, in effect, carrying out a perspective division on or using the information relating to the curve in the homogeneous projected space, or, indeed, by using the information relating to the curve in the homogeneous projected space directly.

For example, in the case where the predetermined information is to allow the position in the defined (e.g. width) direction of the centreline of the curve to be estimated at a given position along the length of the curve, then in the case of a three-dimensional homogeneous projected space defined, for example, by x, y and z axes, the y and z components of the position of the centreline of the curve at a given x position in the homogeneous projected space can be used to estimate the y position at that x position on the centreline of the curve in the projected space, since the y position in the projected space will be the y component in the homogeneous projected space divided by the z component in the homogeneous projected space. Thus, by, for example, storing as the predetermined "extent-estimating" information the y and z components of the position of the curve in the homogeneous projected space, that will then allow the corresponding y position of the centreline of the curve in the projected space for the x position in question to be estimated.

Similar comments apply in the case of the relevant component of the user space normal vector. Again, if the user space unit normal vector in the transformed form of the curve in homogeneous projected space has x, y and z components, then the y component of that unit normal vector in the projected space following the perspective division at a given x (length) position will be given by the y component of the transformed unit normal vector in the homogeneous projected space divided by the z component of the transformed unit normal vector in the homogeneous projected space. Thus, again, by storing the y and z components of the unit normal vector in the transformed form of the curve in homogeneous projected space as the predetermined "extent-estimating" information, that information can then be used straightforwardly to derive the corresponding component of the unit normal vector in the projected space.

Moreover, where, as discussed above, an adjustment factor is to be applied to the unit normal vector, then as will be discussed further below, such an adjustment factor can straightforwardly be derived and applied to each respective component (e.g. the y and z components) of the unit normal vector of the transformed curve in the homogeneous projected space, which adjusted components can then still be used to derive, as discussed above, the corresponding unit normal vector component to be used in relation to the projected form of the stroked curve in the projected space.

Thus, in a particularly preferred embodiment, the predetermined "extent-estimating" information that is stored and used in the present invention comprises for a given position along the "length" of the curve in the homogeneous projected space (along an axis direction in the homogeneous projected space), information relating to the position of the centreline of the curve in its transformed form in the homogeneous projected space at that position, and information relating to the unit normal vector in the transformed form of the curve in the homogeneous projected space at that position. The latter preferably includes a factor based on or relating to a tangent vector to the centreline of the transformed curve in the homogeneous projected space at the position in question.

Thus, in a particularly preferred embodiment of the present invention, where the projected form of the stroked curve in the projected space to be used when rendering a given stroked curve for display comprises a projection of the stroked curve in user space into the projected space via a homogeneous space, the predetermined information to be used when estimating the extent of the stroked curve in the defined direction in the projected space comprises information relating to (at least partially defining) the location of a point on the centreline of the stroked curve as transformed in the homogeneous projected space, and information related to (at least partially defining) the direction in the homogeneous projected space of the user space unit normal vector at that point on the transformed stroked curve in the homogeneous projected space.

It should be noted here that, as will be appreciated from the above, although the testing of the sampling points against the stroked curve "logically" occurs in the projected space as set out above, the implementation of that test does not have to use coordinates or predetermined information of or relating to the projected space itself (although this can be done), but can, for example, as set out above, instead or also use coordinates and predetermined information from or relating to the homogeneous projected space for example. Thus, for example, an equivalent test that uses coordinates from the homogeneous projected space (and without physically performing a perspective division on those coordinates) could be used when implementing the processes of the present invention. (But the testing of the sampling points will still logically be taking place in the projected space (against the projected form of the stroked curve), it is just that the test may be implemented using information relating to the homogeneous projected space.)

As discussed above, for a two-dimensional user space and thus a three-dimensional homogeneous space, the predetermined information for a given position along the length of the stroked curve accordingly preferably comprises two scalar values each representing a component of the position of the centreline of the stroked curve (e.g. and preferably, the y and z components) in the homogeneous projected space at the position along the length of the transformed stroked curve in the homogeneous projected space (and which together can be used to estimate the position in the width direction of the centreline of the stroked curve in the projected space).

Similarly, the predetermined information may, and preferably does, further comprise two scalar values each representing or relating to two components of the unit normal vector of the transformed stroked curve in the homogeneous projected space (e.g., and preferably, the y and z components) at the position in question. Preferably these two values include (take account of) an adjustment factor that is based on the tangent vector to the centreline of the transformed curve in the homogeneous projected space at the position along the stroked curve in homogeneous projected space corresponding to the position along the length of the projected form of the stroked curve in the projected space.

Thus, in a particularly preferred embodiment, the predetermined information stored for a given point along the length of the curve comprises four discrete values.

It will be understood that in the above embodiments the extent of the projected form of the stroked curve in the defined, e.g. width, direction may be estimated as a linear rational function of the user space stroke width (since the stroke width is used to scale the relevant estimated "unit" vector values). It is also contemplated, however, that other functions of the user space stroke width could be used. For example, a quadratic (or higher) rational approximation could be used instead so as to increase the accuracy of the estimation, and thus increase the rendering quality, if desired. (A quadratic (or higher) rational approximation would, as will be appreciated, account for the gap between the tangent to the curve and the curve itself in homogeneous projected space, as well as correct for the derivative of the normal vector.)

As will be appreciated from the above, the predetermined "extent-estimating" information is preferably of the form of a plurality of discrete values (preferably four discrete data values) that can be used, individually or in combination, and alone or (preferably) with other data, to estimate, for example, and preferably, a location in the width (e.g. axis) direction of the centreline of the projected form of the stroked curve and the extent in the defined, e.g. width, direction of the projected form of the stroked curve at the relevant "length" position.

The predetermined information for use in relation to the projected form of the stroked curve to be displayed may be configured and stored in any suitable manner for use by the graphics processing system. In a particularly preferred embodiment, a plurality of discrete data values or sets of data values, e.g., and preferably of the form discussed above, are stored for use for a given form of stroked curve to be displayed.

Most preferably, the appropriate "extent (e.g. width) estimating" data (e.g. and preferably the above described predetermined information) is provided and stored in respect of a plurality of, preferably equally spaced, points along the relevant "length" direction of the stroked curve in the projected space (and thus, most preferably, for a plurality of points that are equally spaced along an axis direction in the projected space, e.g. the x-axis).

Storing the "extent (e.g. width) estimating" data for a plurality of points, and preferably for a plurality of equally spaced points, has a number of advantages. For example, because the information is stored for a plurality of points along the relevant length direction, the information can be stored as a one-dimensional (1D) data structure (i.e. as a set of data for each of a plurality of points along a single direction).

Similarly, by storing the predetermined "width estimating" data in this manner, the data can be retrieved ("looked-up") using a single parameter, i.e. a measure of the position along the relevant length direction of the curve that is of interest. Thus, for example, if the predetermined "extent (width) estimating" data is stored for a plurality of points along, e.g. the x-axis, in the projected space then the relevant x value of a sampling position in the projected space may be used to look-up in the data structure the extent (width) estimating data appropriate to that particular x value.

Thus, in a particularly preferred embodiment, predetermined extent ("width") estimating data is stored for each of a plurality of points that are equally spaced along a given, preferably selected, direction (which will be the "length direction") in the projected space (which direction is preferably parallel to an axis, e.g., the x-axis, in the projected space).

The "extent estimating" data is preferably stored so that it can be retrieved (identified) by reference to the relevant "length" direction position that it relates to. This may be achieved, e.g., by associating each respective set of "extent estimating" data with its corresponding position the along the "length" direction, e.g. x value, and/or by storing the data in an array corresponding to the respective length positions.

This will then allow, for example, when it is desired to determine whether a given sampling point falls within the projected form of the stroked curve or not, the position along the relevant length direction of the sampling position in the projected space, e.g. its x-coordinate, to be used sample (look-up) the appropriate predetermined extent ("width") estimating data in the data store. The retrieved predetermined "extent estimating" information can then be used to determine the extent in the relevant (width) direction of the projected form of the stroked curve at the position along the "length" direction in projected space of the sampling position, e.g., and preferably, in the manner described above.

The predetermined extent (e.g. "width") estimating data for each of a plurality of points can be stored in any suitable and desired manner. However, in a particularly preferred embodiment, the data is stored in the form of one or more graphics textures, and most preferably in one or more 1D (one-dimensional) graphics textures. This is particularly advantageous and beneficial as storing the predetermined data in the form of textures allows existing texture-mapping processes commonly incorporated in graphics processing systems to be used to render stroked curves in the manner of the present invention.

For example, and preferably, each texel in the texture may store the appropriate extent (e.g. width) estimating data for a given length position, and the appropriate length position then used to look-up the appropriate texel or texels (to sample the texture) to retrieve the appropriate predetermined extent (width) estimating information in the normal manner.

It will be appreciated in this regard that in a preferred embodiment, a plurality of such data structures (e.g. textures) will be provided and stored for use by the graphics processing system, each relating to (and associated with) a given stroked curve to be rendered. Each such data structure may be stored separately (e.g. as an individual texture) or a plurality of such data structures may be stored together (in a single overall structure) e.g., one after another in the same texture. Similarly each data structure (e.g. texture) may store data for a single curve or for plural curves.

The appropriate predetermined information to be used in relation to a given sampling position to be tested can be identified and retrieved as desired.

However, in a preferred embodiment, and as discussed above, the relative position along the "length" direction of the projected form of the stroked curve of the sampling position in question is used to retrieve or sample (look-up) the predetermined information to be used for estimating the extent in the defined, e.g. width, direction of the projected form of the stroked curve at that position.

Thus, for example, in the case of a projected form of a stroked curve defined in relation to a projected space having orthogonal x and y axes, as in the preferred embodiment of the present invention, for a given sampling position (x1, y1) in the projected space, the x-position, x1, of the sampling position is preferably used to look-up information for estimating the extent in the width direction of the projected form of the stroked curve at the position along the length of the projected form of the stroked curve corresponding to the x position, x1, of the sampling position.

As will be appreciated by those skilled in the art, where the predetermined information is stored in the form of a graphics texture, this "look-up" can be achieved simply by sampling the texture for the corresponding sampling position, in the normal manner.

As will be appreciated, due to the finite number of points along the length of the curve for which extent (e.g. width) estimating data will be stored, it may be possible, and indeed often likely, that extent estimating data will not be stored for the exact location in the projected space of the sampling point being considered.

Thus, in one embodiment, the predetermined information that is used may be the stored information relating to the nearest point to the position of the sampling position being tested.

However, in a preferred embodiment, an interpolation or filtering process is used when looking up the predetermined information, so as to provide increased accuracy in the case where, for example, there is not a set of data values stored for precisely the "length" position being considered.

For example, in a particularly preferred embodiment, the stored predetermined information (e.g. texture) is sampled using a suitable filtering or interpolation process, such as linear filtering. This will allow the accuracy of the rendering to be increased, whilst still using the same stored data. (Indeed, it is an advantage of the use of graphics textures for storing the predetermined information that standard texture sampling and filtering techniques can then be used to retrieve the information in this way.)

In the case where the data is stored as a graphics texture, standard texture filtering techniques, such as bi-linear filtering may be, and preferably are, used.

(It would also be possible to increase the absolute resolution of the stored data by increasing the number of points along the length direction of the curve for which predetermined information is stored. However, this may not always be desirable. The use of a filtering or interpolation process when sampling the predetermined information thus provides an alternative way of increasing the rendering accuracy without the need to increase the absolute resolution of the stored data.)

The estimated extent in the defined (e.g. width) direction of the projected form of the stroked curve may be used to determine if the sampling position in the "projected" space falls within the projected form of the stroked curve or not in any suitable and desired manner.

However, in a preferred embodiment, the estimated extent in the defined (e.g. width) direction of the projected form of the stroked curve is used, as discussed above, to determine the range of positions in the defined (width) direction that the projected form of the stroked curve covers, and that range of positions is then compared to the corresponding position of the sampling position in question along that direction to see if the sampling position falls within that range of positions (and thus the projected form of the stroked curve) or not. As discussed above, preferably the range of positions covered by the stroked curve is estimated by determining an estimate of the boundary points of the curve.

As discussed above, the range of positions covered by the projected form of the stroked curve in the relevant defined (width) direction may be, and preferably is, determined by using the estimated extent of the projected form of the curve in the defined (e.g. width) direction, and the position of the centre curve of the projected form of the stroked curve in the defined (e.g. width) direction at that point along the length of the curve.

Thus, for example, in the preferred case where the projected form of the stroked curve is defined in relation to x and y axes (in Cartesian coordinates), then for a sampling position (x1, y1), in the projected space, the predetermined information is preferably used to estimate the range of y positions (values) covered by the projected form of the curve at the x position, x1, of the sampling position, and that estimated range of y-positions in the projected space, then compared to the y-position, y1, of the sampling position in the projected space to determine if the sampling position's y-position, and thus the sampling position as a whole, falls within the projected form of the stroked curve or not.

If the sampling position in the projected space falls within the determined range of positions, then the sampling position can be considered to fall within the projected form of the stroked curve. Alternatively, if the sampling position falls outside of the determined range, then the sampling point can be considered to be outside of the projected form of the stroked curve.

Once it has been determined whether the sampling position in the projected space falls within the projected form of the stroked curve or not, that information can then be used to render (shade) the corresponding sampling position in surface space accordingly, i.e. to display it as being inside the stroked curve if the corresponding sampling position (in the projected space) was found to fall within the (estimated) projected form of the stroked curve, and vice-versa. For example, data, such as red, green and blue (RGB) color values and an "alpha" (transparency) value, can then be assigned to each of the sampling points in the surface space based on the result of the determination.

In a particularly preferred embodiment, the result of the determination is used to, in effect, retain or discard the corresponding surface space sampling position from further processing in respect of the stroked curve, as appropriate. Preferably, if the determination shows that the surface space sampling position should be considered to be inside the stroked curve, the corresponding position in the primitive is shaded (e.g. coloured) accordingly, but if it is to be considered to be outside the stroked curve, the position in the primitive is not shaded to have the properties required for the stroked curve in question (e.g., and preferably, is discarded from further processing in respect of the stroked curve).

In other embodiments, instead of discarding a sampling point from further processing if it is considered to be outside of the stroked curve, the sampling point in question could be shaded so as to be completely transparent, and thus, in effect, invisible.

It will be appreciated from the above, that in preferred embodiments of the present invention at least, the corresponding sampling position in the projected space to a sampling point in surface space is preferably used to look up predetermined information relating to a projected form of the stroked curve to be displayed, and that information is then used to estimate the extent in a defined (e.g. width) direction of the projected form of the stroked curve at a point along the length of the projected form of the stroked curve associated with the location of the sampling point in projected space. The estimated extent of the projected form of the stroked curve in the defined direction is preferably then used to determine whether the sampling point in the projected space is within the projected form of the stroked curve or not, preferably by using the estimated extent of the projected form of the stroked curve to estimate the range of positions in the defined (e.g. "width") direction that the projected form of the stroked curve covers, and then determining whether the sampling position falls within that range of positions or not.

Thus, in a particularly preferred embodiment, the present invention comprises steps of or means for:

using the position along one axis in the projected space of the relevant sampling point in the projected space to look-up the predetermined information to be used to estimate the extent along a second axis in the projected space of the stroked curve at that position along the first axis in the projected space; and comparing the estimated extent along the second axis in the projected space of the projected form of the stroked curve at that position along the first axis in the projected space with the position of the sampling position in the projected space along the second axis in the projected space to determine if the sampling position in the projected space falls within the projected form of the stroked curve in the projected space.

In such an arrangement that uses a Cartesian coordinate system (i.e. x and y axes), for example, then for a given sampling position to be tested having the location (x1, y1), the x-coordinate of the sampling position, x1, would be used to look-up information allowing the extent of the projected form of the stroked curve in the y-direction at the x-position, x1, to be estimated, and then the estimated "y-extent" of the projected form of the stroked curve at the x-position x1 (which is preferably, as discussed above, determined in terms of a range of y values that the curve should be considered to cover), compared to the y-position, y1, of the sampling position being tested, to see if that sampling position lies within the projected form of the stroked curve or not.

As will be appreciated by those skilled in the art, this testing step (i.e. looking up and using the predetermined information to determine whether a sampling point falls within the projected form of the stroked curve or not) should be repeated for each sampling point in the surface space to be tested. Thus it will in practice typically be performed for a plurality of sampling positions in order to render the stroked curve for display.

Although the present invention has been described above with reference primarily to the rendering of a given, single stroked curve for display, as will be appreciated by those skilled in the art, and as discussed above, the present invention is applicable to multiple different forms of stroked curve, and in a preferred embodiment may be used to render each of a plurality of different stroked curves.

Thus, in a particularly preferred embodiment, a plurality of different set of predetermined information (e.g. textures), each representing different stroked curves to be rendered are provided and stored for use by the graphics processing system. Then for any given curve to be drawn, the predetermined information (e.g. texture) most appropriate to that curve can be identified and selected, and used to render the curve. Accordingly, by representing a suitable range of curves in the manner of the present invention, then it should be possible to render a range of stroked curves, such, as and preferably, the stroked curves necessary to render a given font for display.

The sets of predetermined information (e.g. textures) representing the stroked curves are preferably generated in advance, and then suitably stored for use by the graphics processing system, for example, and preferably, along with other texture maps that the graphics processing system may use. A given set of predetermined information (e.g. texture) may then be selected, and used, as appropriate when the stroked curve in question is to be rendered.

The appropriate set of predetermined information (e.g. texture) to be used for a given stroked curve to be rendered for display can be identified and selected as desired. For example, the application requiring the stroked curve to be drawn could indicate to the graphics processing system which set (or sets) of predetermined information (e.g. texture or textures) is to be used.

It will be appreciated from the above, that the present invention does not, in effect, test the sampling points in the projected space against the projected form of the stroked curve per se, but rather uses predetermined information relating to or derived from the projected form of the stroked curve to test the sampling positions. Moreover, this predetermined information is, in effect, derived by using a defined projected form of the stroked curve as defined in user space (or at least of the centre path of that curve).

Thus, according to an eighth aspect of the present invention, there is provided a method of rendering a stroked curve for display in a graphics processing system, the method comprising:

receiving an input stroked curve defined in user space to be displayed;

projecting the received stroked curve using a received transformation into a surface space for display; and for each of one or more sampling points in the surface space:

determining a corresponding sampling position in a projected space;

using the position of the sampling position in the projected space to sample a set of predetermined information, the predetermined information containing information derived from a defined projection of the stroked curve;

using the sampled predetermined information to determine whether the sampling position in the projected space falls within the projected form of the stroked curve or not; and assigning data for rendering the received stroked curve for display to the sampling point in surface space that corresponds to the sampling position in the projected space in accordance with said determination.

According to a ninth aspect of the present invention, there is provided an apparatus for rendering a stroked curve for display in a graphics processing system, the apparatus comprising:

means for receiving an input stroked curve defined in user space to be displayed;

means for projecting the received stroked curve using a received transformation into a surface space for display; and means for, for each of one or more sampling points in the surface space, determining a corresponding sampling position in a projected space;

means for using the position of a sampling position in the projected space to sample a set of predetermined information, the predetermined information containing information derived from a defined projection of the stroked curve;

means for using sampled predetermined information to determine whether a sampling position in the projected space falls within the projected form of the stroked curve or not; and means for assigning data for rendering the received stroked curve for display to a sampling point in surface space that corresponds to a sampling position in the projected space in accordance with said determination.

As will be appreciated by those skilled in the art, these aspects and embodiments of the present invention can and preferably do include any one of the preferred and optional features of the invention described herein as appropriate. Thus, for example, the set of predetermined information is preferably stored in the form of a graphics texture, preferably as a 1D texture.

As discussed above, it is particularly preferred in the present invention for the predetermined "extent (e.g. width) estimating" information to be stored in the form of one or more graphics textures, as this is particularly advantageous and beneficial.

Indeed, it is believed that the use of graphics textures of this form, i.e. graphics textures containing width estimating data for use in the rendering of stroked curves by a graphics processing system may be new and advantageous in its own right. Moreover, such textures may, as discussed above, be generated in advance, and thus, e.g., provided as commodities in their own right for use with graphics processing systems, e.g., as a set of textures to be loaded for use by a graphics processing system.

The present invention accordingly also extends to the construction of such textures and to such textures themselves.

Therefore according to a tenth aspect of the present invention, there is provided a graphics texture for use in a graphics processing system when rendering a stroked curve for display, wherein each texel of the texture has associated with it information for use in determining an estimate of the extent in a defined direction of a stroked curve defined within a defined space at a point on the curve.

According to an eleventh aspect of the present invention, there is provided a method of constructing a graphics texture for use with a graphics processing system when rendering a stroked curve for display, the method comprising:

defining a stroked curve in user space;

determining a transformation to transform the stroked curve such that the stroked curve has a defined transformed form;

determining information for use in determining an estimate of the extent in a defined direction or directions of the transformed form of the stroked curve at each of a plurality of points along the length of the transformed form of the stroked curve; and generating and storing one or more graphics textures, each comprising an array of texels, wherein each texel of the texture or textures is associated with at least one of the plurality of points along the length of the transformed form of the stroked curve and contains some or all of the determined information for that at least one point.

According to a twelfth aspect of the present invention, there is provided an apparatus for constructing a graphics texture for use with a graphics processing system when rendering a stroked curve for display, the apparatus comprising:

means for defining a stroked curve in user space;

means for determining a transformation to transform the stroked curve such that the stroked curve has a defined transformed form;

means for determining information for use in determining an estimate of the extent in a defined direction or directions of the transformed form of the stroked curve at each of a plurality of points along the length of the transformed form of the stroked curve; and means for generating and storing one or more graphics textures, each comprising an array of texels, wherein each texel of the texture or textures is associated with at least one of the plurality of points along the length of the transformed form of the stroked curve and contains some or all the determined information for that at least one point.

As will be appreciated by those skilled in the art, these aspects and embodiments of the present invention can and preferably do include any one of the preferred and optional features of the invention described herein as appropriate. Thus, for example, the transformed form of the stroked curve is preferably as discussed above and the transformation is preferably performed in a homogeneous space. Similarly, the process preferably involves placing the stroked curve in a homogeneous space, transforming the curve in the homogeneous space, and projecting the transformed curve into a projected space by means of a perspective division, and then determining information for use in determining an estimate of the extent in a defined direction or directions of the projected and/or transformed form (homogeneous projected space form) of the stroked curve at each of a plurality of points along the length of the projected and/or transformed form of the stroked curve.

Similarly, the graphics texture preferably comprises a 1D texture, and the stored information for each texel preferably comprises a plurality of, most preferably four, data values, preferably of the form(s) discussed herein, most preferably that can be used, together with other information, for example, the stroke width of the stroked curve in user space, to estimate the extent in the defined (e.g. "width") direction of the stroked curve in a projected space at the point that the texel relates to. The determined transformation to transform the stroked curve into its transformed form is preferably also stored (and associated with the curve to which it relates).

The predetermined information for a given point along the length of the curve could be stored in a single texel of a graphics texture. For example, in a four channel graphics texture (storing RGBA), each texel could be used to store the four values discussed above.

Alternatively, the predetermined information, e.g. the four values, for a point in the projected space could be stored in a plurality of texels, either of a single graphics texture or of a plurality of graphics textures. For example, for a single channel (gray-scale) graphics texture, four individual texels of the graphics texture could be used to store the four values (items of predetermined information) discussed above.

Although, as discussed above, a single graphics texture could be used to store the predetermined width estimating data for use in the rendering of any number of stroked curves, in a particularly preferred embodiment, a single graphics texture is used to store the width estimating data for only a single stroked curve. In other words, each graphics texture preferably contains the information needed to render a particular stroked curve only.

For example, the graphics processing system of the present invention preferably uses (is able to access) a plurality of graphics textures, wherein each texture contains information for use in rendering a particular stroked curve, e.g. a stroked curve that forms a letter, number, symbol, etc, or portion thereof, of a particular font.

Constructing the graphic textures in this manner is particularly beneficial in that it allows the graphics processing system to be updated as appropriate, for example, when new fonts are created (desired to be rendered) by adding the relevant graphics textures (for rendering the new fonts) to the plurality of textures already available for use by the system.

As will be appreciated, the plurality of data structures, e.g. graphics textures, to be used by the graphics processing system can be constructed and provided to the graphics processing system as desired.

For example, in one preferred embodiment, some or all of the, e.g., graphics textures, may be, and preferably are, constructed by the graphics processing system itself, and then stored in a suitable data store (e.g. memory) of, or accessible by, the system.

In this case, the application requiring a stroked curve to be rendered may, e.g., initially define a stroked path to be rendered, which may comprise one or more line segments. Preferably, the stroked path is defined by the position of one or more control points in user space, information concerning the types of curves (lines) to be drawn between (defined by) the control points, and information indicating the stroke width in user space. This information defining the stroked path to be rendered is then preferably passed by the application to the graphics processing system which will render the stroked curve.

Preferably, the graphics processing system will then determine, based on the information received from the application, whether the stroked path as initially defined by the application needs to be sub-divided, for example, into the separate line segments forming the stroked path and/or because a particular stroked curve to be rendered is unable to be rendered in its current form, and, if required, sub-divide the stroked curve as initially defined as necessary based on the result of this determination into a plurality of individual stroked curves to be rendered.

The received stroked curve, or each of the individual stroked curves generated following sub-division, is preferably then assigned (provided with) an identifier, e.g. a specific identification (ID) number, by the graphics processing system. This identifier, which is preferably also passed to the application, will be used by the graphics processing system (the implementation), and the application, to identify the curve (e.g. in the future).

The graphics processing system preferably then determines the information required to render the curve or curves in accordance with the present invention, and associates this information with the identifier, e.g. the ID number, of each respective curve in question. For example, the system preferably determines the user-to-projected transformation and the predetermined information, e.g. in the form of one or more specially constructed graphics textures, for each of the curves to be rendered. This information may then be stored and associated with the curve in question for use then (and in the future) to render the curve in the manner of the present invention.

It also contemplated that the plurality of data structures, e.g. graphics textures, and user-to-projected transformations, may be determined externally of the graphics processing system, and provided to the graphics processing system for use. This may be done, e.g., on any suitable processor or computer system, such as a host system. The generated data structures, etc., may then, e.g., be stored on a portable computer readable medium, such as a flash memory card, CD-ROM, ROM or the like, and the information on the portable computer readable medium then transferred to a suitable data store (e.g. memory) of (or accessible by) the graphics processing system for use. Such data transfer could also or instead be done, e.g., via the Internet, wirelessly, etc., if desired.

This may be particularly suitable for textures (e.g.) to be used for rendering a font, as in that case the curves (and thus textures) may all be predefined.

It will appreciated that in these arrangements, prior to rendering the stroked curve, the graphics processing system will have access to both a stored data structure (which is preferably in the form of a graphics texture) containing the predetermined "extent-estimating" information to be used when rendering the stroked curve, and a predefined user-to-projected transformation for use when rendering the stroked curve (to use for mapping the sampling points to the "projected space" that the projected form of the stroked curve is defined in), for each stroked curve for which this information is available. (As discussed above, the user-to-projected transformation and/or the predetermined information may be determined (calculated) by the system itself, or alternatively may be obtained from, for example, a computer readable medium.)

This information will preferably be stored in association with an appropriate identifier or identifiers to allow it to be retrieved on the basis of a given identifier for a stroked curve.

To then render a stroked curve for display, the application requiring the curve preferably specifies the user-to-surface transformation, the user space stroke width, and the identifier or identifiers, e.g. ID number(s), of the curve or curves to be rendered, and passes this information to the graphics processing system. These pieces of information may be passed to the system at the same time, or alternatively, and as will be appreciated by those skilled in the art, at different times.

The graphics processing system may then use the received curve identifier or identifiers to look up (retrieve) the stored predetermined rendering information that is associated with the curve or curves in question, e.g. the user-to-projected transformation and the one or more specially constructed textures, and can then use that information, for example, and preferably, in the manner described above, to render the stroked curve or curves for display.

Thus, according to a further aspect of the present invention, there is provided a method of rendering a stroked curve for display in a graphics processing system, in which there is stored for each of one or more predefined forms of stroked curve, and in a manner accessible to the graphics processing system, predetermined information for estimating the extent in a defined direction of a projected form of the stroked curve in a projected space at each of a plurality of positions along the length of the projected form of the stroked curve and a predefined user-to-projected transformation for the stroked curve, in association with an identifier for the curve to which the predetermined information and predefined user-to-projected transformation relates, the method comprising:

an application requiring a stroked curve corresponding to one of the predefined forms of stroked curve to be rendered, providing to the graphics processing system the identifier identifying the stroked curve to be rendered, a defined user-to-surface transformation for transforming the stroked curve to be rendered to a surface space for display, and a desired user space stroke width for the stroked curve; and the graphics processing system using the provided identifier for the stroked curve to be rendered to retrieve the stored predetermined extent estimating information and user-to-projected transformation for that curve, and then using that information together with the specified user-to-surface transformation and user space stroke width to render the stroked curve for display.

According to a further aspect of the present invention, there is provided a graphics processing system for rendering a stroked curve, in which there is stored for each of one or more predefined forms of stroked curve, and in a manner accessible to the graphics processing system, predetermined information for estimating the extent in a defined direction of a projected form of the stroked curve in a projected space at each of a plurality of positions along the length of the projected form of the stroked curve and a predefined user-to-projected transformation for the stroked curve, in association with an identifier for the curve to which the predetermined information and predefined user-to-projected transformation relates, the system comprising:

means for receiving from an application requiring a stroked curve corresponding to one of the predefined forms of stroked curve to be rendered, an identifier identifying the stroked curve to be rendered, a defined user-to-surface transformation for transforming the stroked curve to be rendered to a surface space for display, and a desired user space stroke width for the stroked curve; and means for using the provided identifier for the stroked curve to be rendered to retrieve the stored predetermined extent estimating information and user-to-projected transformation for that curve, and then using that information together with the specified user-to-surface transformation and user space stroke width to render the stroked curve for display.

As will be appreciated by those skilled in the art, these aspects of the present invention can and preferably do include any one or more or all of the preferred and optional features of the invention described herein, as appropriate. Thus, for example, the predetermined information, etc., is preferably used to render the stroked curve for display in one or more of the manners described herein.

The present invention can be used to render any desired form of stroked curve. As discussed above, it is believed that the present invention will be particularly, albeit not exclusively, suited to the rendering of stroked curves that are to be used to construct fonts (e.g. that form all or parts of characters, such as letters, of fonts). Thus, in a particularly preferred embodiment, the stroked curve to be displayed in the present invention is a stroked curve relating to a character of a font. Similarly, in a preferred embodiment, a plurality of sets of predefined information (e.g. textures), etc., each relating to a stroked curve relating to a character of a font are stored and used.

As will be appreciated by those skilled in the art, various modifications, variations and additions to the present invention as described above and herein would be possible.

For example, in a preferred embodiment, the values used in the perspective division to project the transformed stroked curve in the homogeneous projected space into the projected form, e.g. typically the third coordinate value for a 3D homogeneous space, are preferably cross-multiplied as this will help to optimise the estimation process. If this is being done, then it is preferable to ensure that all these values (i.e. the values used in the perspective division) are strictly positive. This may be achieved, for example, by checking that the primitives (e.g. bounding polygons) used to render the curve all have positive third coordinate values (or whatever value is being used in the perspective division) after being suitably transformed, as discussed above, in the homogeneous space. In the case where those values are linearly interpolated between the vertices, then preferably only the values for the vertices of the bounding polygons are checked directly (as if those values are positive, that should ensure that all values within the primitives are positive as well).

It would also be possible, for example, to implement the testing steps of the present invention using a "two-pass" approach, in which an intermediate look-up table of the extent of the curve in the defined, e.g. width, direction is derived, based on a specified curve scale and line width.

For example, in a "one-pass" approach, in order to determine whether a sampling point in surface space falls within the stroked curve or not, the relevant predetermined data in the texture is preferably combined with the user space stroke width to determine the range of positions in the, e.g. width, direction covered by the projected form of the stroked curve at the relevant position along its length (e.g. to determine first (maximum) and second (minimum) locations along the width direction). The location of the sampling point along the width direction is then preferably compared to the determined first (maximum) and second (minimum) locations, and the result used to determine whether the sampling point is within the stroked curve or not.

In a "two-pass" approach, the stored predetermined information in the one or more graphics textures (for example) may be used, for each of the positions along the "length" direction for which information is stored, together with the user space stroke width, to, in a first "pass", determine and store in a texture the range of positions in the width direction covered by the projected form of the stroked curve at each position along its length (e.g. to determine first (maximum) and second (minimum) locations along the width direction).

This texture constructed in the first pass which stores the determined first (maximum) and second (minimum) locations (e.g. two scalar values) for each of the positions along the "length" direction can then be used in a second "pass" to determine whether a sampling point is within the stroked curve or not (by sampling the constructed texture to obtain the first (maximum) and second (minimum) values along the width direction for the sampling point, and comparing the obtained extent to the location of the sampling point along the width direction).

Performing the present invention using a "two-pass" approach in this manner may be beneficial in some instances since it moves some of the processing from a per-fragment operation (a 2D domain) to a per x-operation (a 1D domain), albeit potentially at the expense of set-up overhead and potentially non-uniform sampling of the domain.

The methods and systems of the present invention can be carried out and implemented in any suitable and desired manner on or in a graphics processing system. For example, the graphics processing system could comprise programmable fragment shader hardware that has been suitable programmed to perform the steps of the present invention. Alternatively, the graphics processing system could comprise suitable fixed function hardware.

For example, the "compare and discard" process for determining whether to retain or discard a surface space sampling point as falling within the stroked curve in the surface space or not as discussed above could be carried out using, for example, a compare and conditional discard routine in the case of a graphics processing system that has programmable fragment shader hardware.

Where the present invention is implemented, for example, in a fragment shader in such a way so as to disable standard multi-sample anti-aliasing, then that could, for example, be compensated for by determining a coverage value for fragments close to the boundary of the curve if desired.

With a graphics processing system that has fixed functional hardware, this operation could be implemented by, for example, passing the sampling points one or more times through the graphics rendering pipeline so as to carry out the necessary operations in respect of each sampling point in the desired sequence.

In a particularly preferred embodiment, the various functions of the present invention are carried out on a single graphics processing platform that generates and outputs the data that is written to the frame buffer of a display device.

The present invention is applicable to any form or configuration of renderer, such as renderers having a "pipelined" arrangement (in which case the renderer will be in the form of a rendering pipeline). In a preferred embodiment, it is to a hardware graphics rendering pipeline. The various functions and elements of the present invention can be implemented as desired, for example, and preferably, by using appropriate functional units, processing logic, circuitry, processors, microprocessor arrangements, etc.

As discussed above, the present invention is applicable to all forms of rendering, such as rasterisation-based rendering or ray-tracing, immediate mode rendering, deferred-mode rendering, tile-based rendering, etc.

As will be appreciated from the above, the present invention is particularly, although not exclusively, applicable to 3D graphics processors and processing devices, and accordingly extends to a 3D graphics processor and a 3D graphics processing platform including the apparatus of or operated in accordance with any one or more of the aspects of the invention described herein. Subject to any hardware necessary to carry out the specific functions discussed above, such a 3D graphics processor can otherwise include any one or more or all of the usual functional units, etc., that 3D graphics processors include.

The invention similarly extends to a 2D graphics processor and to 2D graphics processing.

It will also be appreciated by those skilled in the art that all of the described aspects and embodiments of the present invention can, and preferably do, include, as appropriate, any one or more or all of the preferred and optional features described herein.

The methods in accordance with the present invention may be implemented at least partially using software, e.g. computer programs. It will thus be seen that when viewed from further aspects the present invention provides computer software specifically adapted to carry out the methods herein described when installed on data processing means, a computer program element comprising computer software code portions for performing the methods herein described when the program element is run on data processing means, and a computer program comprising code means adapted to perform all the steps of a method or of the methods herein described when the program is run on a data processing system. The data processor may be a microprocessor system, a programmable FPGA (field programmable gate array), etc.

The invention also extends to a computer software carrier comprising such software which when used to operate a graphics processor, renderer or microprocessor system comprising data processing means causes, in conjunction with said data processing means, said processor, renderer or system to carry out the steps of the methods of the present invention. Such a computer software carrier could be a physical storage medium such as a ROM chip, CD ROM or disk, or could be a signal such as an electronic signal over wires, an optical signal or a radio signal such as to a satellite or the like.

It will further be appreciated that not all steps of the methods of the invention need be carried out by computer software and thus from a further broad aspect the present invention provides computer software, and such software installed on a computer software carrier, for carrying out at least one of the steps of the methods set out herein.

The present invention may accordingly suitably be embodied as a computer program product for use with a computer system. Such an implementation may comprise a series of computer readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

BRIEF DESCRIPTION OF THE DRAWINGS

A number of preferred embodiments of the present invention will now be described, by way of example only, and with reference to the accompanying drawings, in which:

FIG. 5 shows the projection of the transformed stroked curve of FIG. 4 from homogeneous projected space into the projected space via a perspective division according to a first embodiment of the present invention;

FIG. 6 shows the projection of the transformed stroked curve of FIG. 4 from homogeneous projected space into the projected space via a perspective division according to a second embodiment of the present invention.

Like reference numerals are used for like components in the Figures unless otherwise indicated.

DETAILED DESCRIPTION

Figure 1:
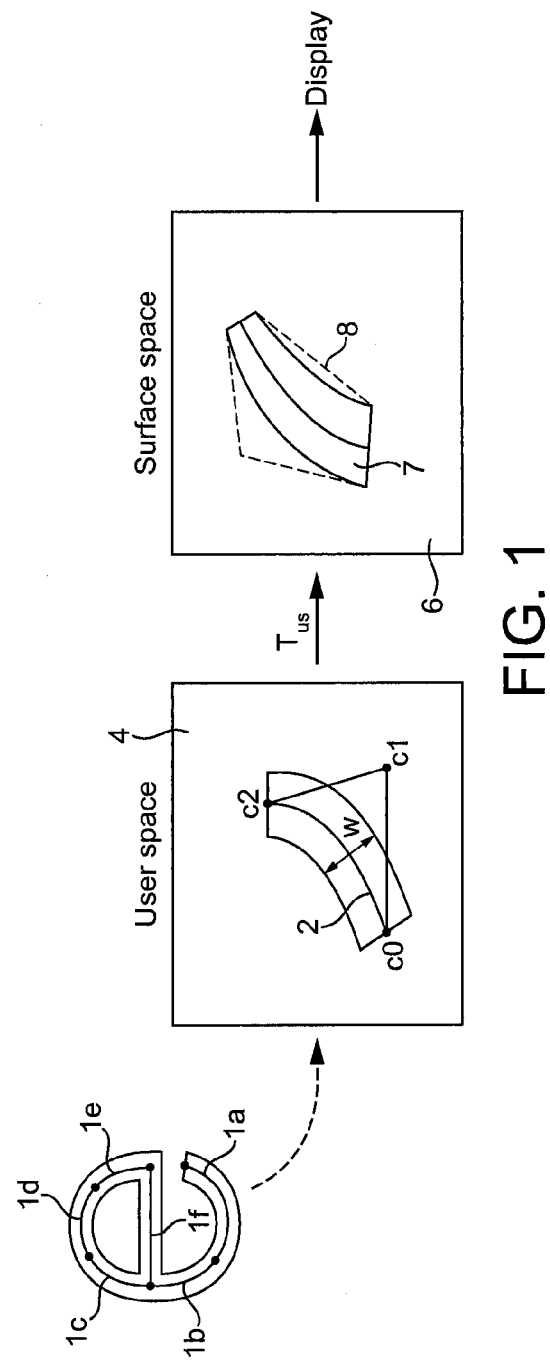
FIG. 1 shows schematically the process of rendering a stroked curve from its definition in user space to the curve output on a display.

FIG. 1 shows schematically the principle processes of an embodiment of the present invention in which one or more predefined stroked curves are rendered for display. The predefined stroked curves that are rendered using the technique of the present invention could be, for example, portions of characters, e.g. letters, numbers, symbols, etc in font sets, or parts of labels, e.g. arrows, etc, on maps in satellite navigation (satnav) systems.

In the present embodiment, i.e. that shown in FIG. 1, a predefined stroked path to be rendered is shown, wherein the stroked path is formed from six individual line segments 1a-1f that collectively form a letter "e".

The rendering technique of an embodiment of the present invention will now be described in relation to the line segment identified as 1a, however, it will be appreciated that each of the other line segments of the letter, e.g. 1b-1f, will equally be rendered using such a technique or, alternatively, any other rendering technique as desired.

In the present embodiment, the line segment 1a is a quadratic bezier curve 2 that is initially defined in a 2D user space 4 by: the position of start and end control points $c_0$ and $c_2$ of the curve; the position of an intermediate control point $c_1$; and a stroke width w. It will nevertheless be understood, however, that the technique of the present invention can be used to render other types of stroked curves, e.g. elliptic arcs, cubic curves and B-splines (e.g. NURBS).

In order to render the stroked curve for display, the stroked curve, or typically information that defines the stroked curve, such as the position in user space of the control points $c_0$, $c_1$ and $c_2$ and the type of curve, is initially input to a graphics processing system.

During the rendering process, as is known in the art, the stroked curve 2 as defined in user space is projected into a 2D surface space 6, which has the same perspective (geometry) of the display onto which the stroked curve is to be viewed. The transformation that projects the stroked curve from user space 4 to surface space 6 is referred to herein as the user-to-surface transformation (TUS), and will be provided to the graphics processing system in use.

Once the stroked curve has been projected into the surface space, a primitive (or primitives), such as the polygon 8 shown in FIG. 1 which fits tightly to, and that covers the projected stroked curve 7 in surface space 6 is generated.

As is known in the art, the primitive 8 is then rasterised to a plurality of sampling points, and the sampling points defined in the rasterisation process will ultimately be appropriately shaded (based on whether they are considered to fall within the area bounded by the stroked curve in surface space or not) so as to display the stroked curve.

In the present embodiment, and in accordance with the present invention, the determination of whether or not a sampling point in surface space falls within the stroked curve in surface space is made by using predetermined information that relates to a particular projection of the user space stroked curve into a projected space. The projection into the projected space of the user space stroked curve is designed to be of a form that allows the extent of the projected form of the curve along a defined "width" direction in the projected space, which in the present embodiment is along the y-axis, for a given position along a perpendicular ("length") direction in the projected space, which in the present embodiment is the x-axis, to be estimated. This estimated extent of the projected form of the stroked curve along the y-axis (width direction) in the projected space can then be used, as explained in more detail below, to determine whether a sampling point should be considered to fall within the stroked curve or not.

The form that this predetermined information takes, and the manner by which it is generated, will now be discussed.

Figure 2:
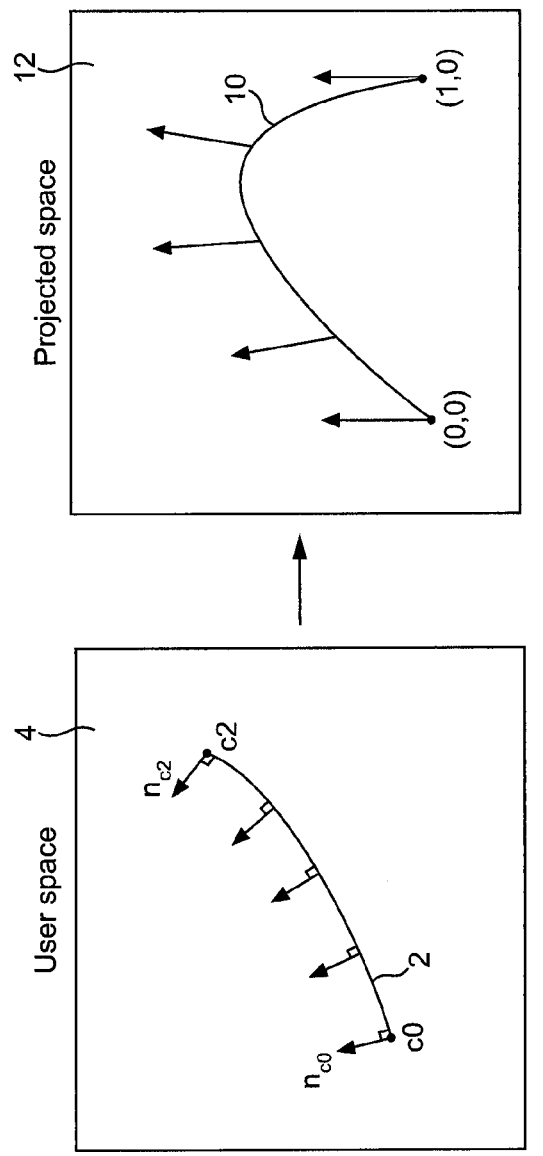
FIG. 2 shows the transformation of a stroked curve in user space to a desired form in projected space.

In the present embodiment, and as shown in FIG. 2, the projected form of the stroked curve is a particular form of projection 10 of the user space stroked curve such that the start control point c0 of the user space stroked curve is mapped to a first position in the projected space and the end control point c2 of the user space stroked curve is mapped to a second position in the projected space. In the present embodiment, the first position, i.e. the location to which the start point c0 is projected, is (0,0) (the origin in the projected space)—coordinates in projected space being given in Cartesian coordinates—and the second position, i.e. the location to which the end point c2 is projected, is (1,0) in the projected space. It will be understood, however, that the first and second positions can chosen as desired, and can vary between different stroked curves to be rendered.

Moreover, the projected form of the stroked curve is a projection of the user space stroked curve in which the normal vectors nc0 and nc2 for the start and end control points in the user space stroked curve are reorientated such that they are parallel to (and point upwards along) the y-axis in the projected space 12 (i.e. parallel to the defined "width" direction in the projected space). Such reorientation of the user space normal vectors associated with the two end points of the curve, as will be appreciated, will result in the other normal vectors of the curve (as defined in user space) also being reoriented so as to be more parallel to (and so as to be approximately parallel to) the y-axis in the projected space (as shown in FIG. 2).

In the present embodiment, the projected form of the stroked curve is related to the user space form of the stroked curve, inter alia, by a transformation (a "user-to-projected" transformation) that transforms the stroked curve as it appears in user space to, or at least towards, its desired projected form in the projected space. In other words, the arrangement is such that the projected form of the stroked curve can be generated from the stroked curve as defined in user space by using, inter alia, a particular "user-to-projected" transformation.

Moreover, in the present embodiment, the user-to-projected transformation used when mapping the user space stroked curve to its projected form in the projected space is applied in a homogeneous space (as is commonly done for many computer graphics processes). This has the advantage that matrix multiplication can be used to represent both rotation and scaling, and also translation and perspective, as is known in the art. To do this, the curve as defined in user space is first placed into a homogeneous user space, and the relevant user-to-projected transformation then applied to it to place the curve in a homogeneous projected space. The so-transformed curve may then, as is known in the art, be subjected to a perspective division to project the transformed curve from the homogeneous projected space into the projected space.

Figure 3:
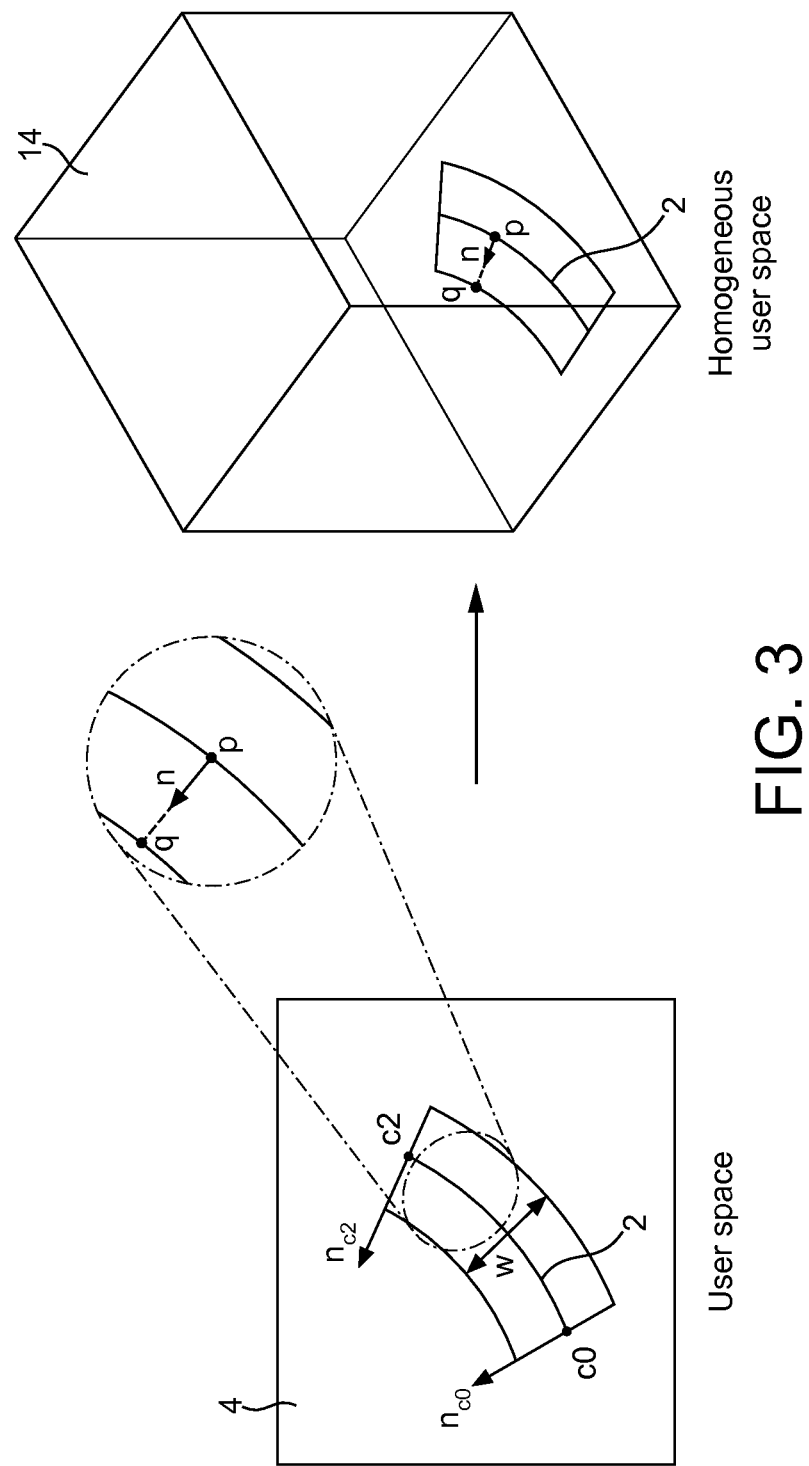
FIG. 3 shows the placing of a stroked curve in user space into homogeneous user space.
Figure 4:
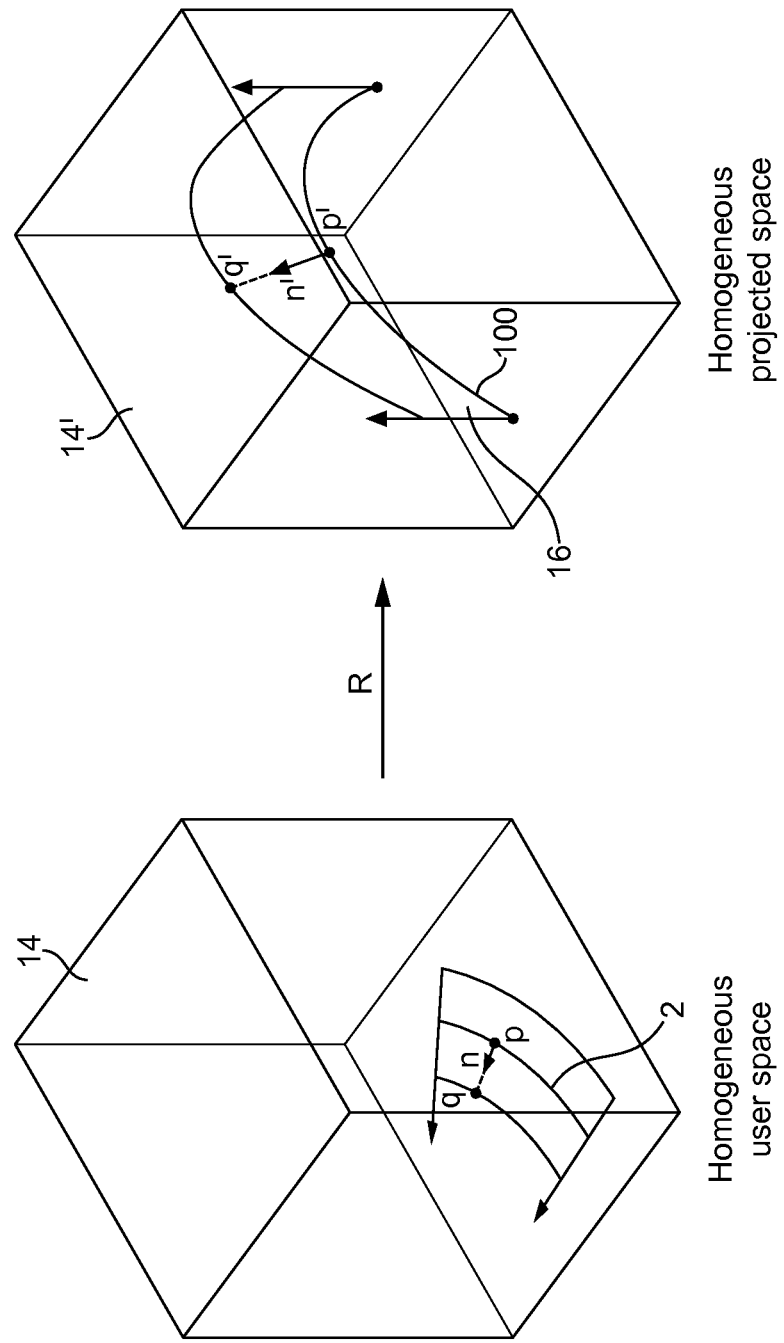
FIG. 4 shows the transformation of the stroked curve in homogeneous user space of FIG. 3 into a desired form in homogeneous projected space, i.e. by being transformed by the matrix R as discussed below.

This process is illustrated in FIGS. 3, 4 and 5.

FIG. 3 shows a stroked curve 2 in (2D) user space 4 being placed into a 3D homogeneous user space 14.

As shown in FIG. 4, the stroked curve 2 in the homogeneous space 14 is then transformed using a user-to-projected transformation R into a transformed form 16 of the stroked curve in a homogeneous projected space 14'.

The transformed stroked curve 16 is then projected into a 2D projected space 12 through a perspective division. This is shown in FIG. 5.

(It should be noted here that FIGS. 4 and 5 only show one side of the stroked curve from the centreline 100 of the stroked curve in its transformed and projected forms for clarity purposes. However, as will be appreciated by those skilled in the art, in practice the lower half of the stroked curve 16 will be (appropriately) present in the transformed and projected forms of the stroked curve.)

The first step in calculating the predetermined information to be used when rendering a stroked curve in the present embodiment is therefore to determine the user-to-projected transformation R that would be applied in the homogeneous space when projecting the stroked curve 2 as defined in the user space 4 to its desired projected form in the projected space 12.

The derivation of this user-to-projected transformation is performed in the present embodiment as follows:

Let it be assumed that the stroked curve to be displayed has start and end control points at A=(a1,a2) and B=(b1,b2) in user space, with the user space unit normal vectors at the points A and B being the vectors $c=c1i+c2j$ and $d=d1i+d2j$, respectively, where i and j are the Cartesian basis vectors of user space. As discussed above, a transformation is desired such that this curve in user space can be projected to a projected space such that:

i) the point A in user space maps to the point (0,0) in projected space;

ii) the point B in user space maps to the point (1,0) in projected space;

iii) the normal vector c in user space is vertical in projected space (i.e. parallel to the y-axis), and has the correct scale for an infinitesimal extent, i.e. (A+εc) in user space→(0,ε) in projected space as ε→0; and iv) the normal vector d in user space is vertical in projected space, and has the correct scale for an infinitesimal extent, i.e. (B+εd) in user space→(1,ε) in projected space as ε→0.

As will be appreciated, such a user-to-projected transformation (which will be herein represented as R) can be expressed as the result of two separate transformations: an affine transformation, M, which rotates, translates and scales the curve so as to satisfy conditions (i) and (ii); and a projective transformation, P, which enforces the conditions (iii) and (iv), whilst leaving the position of the two endpoints in the projected form of the curve unaffected.

By making use of homogeneous coordinates, i.e. by representing points in the 2D user space in a 3D homogeneous space, the user-to-projected transformation R can be expressed as:

$$R = PM = \begin{pmatrix} P_{11} & P_{12} & P_{13} \\ P_{21} & P_{22} & P_{23} \\ P_{31} & P_{32} & P_{33} \end{pmatrix} \begin{pmatrix} M_{11} & M_{12} & M_{13} \\ M_{21} & M_{22} & M_{23} \\ M_{31} & M_{32} & M_{33} \end{pmatrix}$$

Since the matrix M is affine, then:

$$M = \begin{pmatrix} M_{11} & M_{12} & M_{13} \\ M_{21} & M_{22} & M_{23} \\ 0 & 0 & 1 \end{pmatrix}$$

The calculation of the matrix M is a standard exercise in linear algebra, and can be easily determined for a particular curve, e.g. by using a suitably configured processor.

For example, the matrix M could be expressed as M=MsMrMt, wherein: the matrix Mt translates the point A such that it will end up at the location (0,0) in the projected space (i.e. following a perspective division); the matrix Mr rotates the (translated) curve about the origin (0,0) in the projected space such that the point B will lie on the x-axis in the projected space (i.e. following a perspective division); and finally the matrix $M_s$ scales the (translated and rotated) curve such that the point B will lie at the location (1,0) in the projected space (i.e. following a perspective division)).

Turning to the matrix P, it will firstly be appreciated that the matrix P must have no effect on the position of the transformed end points of the curve. In other words:

$$PM(\begin{array}{ccc} a_1 & a_2 & 1 \end{array})^T = P(\begin{array}{ccc} 0 & 0 & 1 \end{array})^T = (\begin{array}{ccc} 0 & 0 & 1 \end{array})^T; \text{ and}$$

$$PM(\begin{array}{ccc} b_1 & b_2 & 1 \end{array})^T = P(\begin{array}{ccc} 1 & 0 & 1 \end{array})^T = (\begin{array}{ccc} 1 & 0 & 1 \end{array})^T$$

Accordingly, it will be clear to the skilled person that the elements $P_{13}$, $P_{23}$ and $P_{31}$ of the matrix P must be zero. Therefore:

$$R = \begin{pmatrix} P_{11} & P_{12} & 0 \\ 0 & P_{22} & 0 \\ P_{31} & P_{32} & P_{33} \end{pmatrix} \begin{pmatrix} M_{11} & M_{12} & M_{13} \\ M_{21} & M_{22} & M_{23} \\ 0 & 0 & 1 \end{pmatrix}$$

By enforcing the conditions (iii) and (iv) above on the matrix P, then a set of linear simultaneous equations can be formed. By solving these equations, it can be determined that there is only one possible solution for the matrix P, which is:

$$P = \begin{pmatrix} c_2' & -c_1' & 0 \\ 0 & d_2' & 0 \\ c_2'(1-d_2') & d_1'c_2' - c_1' & c_2'd_2' \end{pmatrix}$$

where $c' = Mc$, i.e. $M(\begin{array}{ccc} c_1 & c_2 & 0 \end{array})^T = (\begin{array}{ccc} c_1' & c_2' & 0 \end{array})^T$; and $d' = Md$, i.e. $M(\begin{array}{ccc} d_1 & d_2 & 0 \end{array})^T = (\begin{array}{ccc} d_1' & d_2' & 0 \end{array})^T$ (As will be appreciated, if either $c_2'$ or $d_2'$ are zero, i.e. the normal vectors at the end points of the stroked curve will be horizontal after applying the matrix M, then it will not be possible to use the technique of the present embodiment to render the curve (at least in that user space form). In such an event, the initial stroked curve is preferably subdivided, and then rendered as two separate stroked curves.)

Following the above, the "user-to-projected" transformation that transforms the stroked curve as placed into homogeneous user space 14 from user space 4 into a suitable form such that the curve has the desired form in the projected space 12 following the projection of the transformed curve from homogeneous projected space 14' into projected space (by perspective division) will be known. This transformation is preferably then stored for future use, in association with an identifier for the curve to which it relates.

The next step for calculating the predetermined information relating to the projected form of the stroked curve that will be used in the present embodiment will now be described with reference to FIGS. 3, 4 and 5.

To illustrate the calculation of the predetermined information relating to the projected form of the stroked curve that will be used in the present embodiment, a point p on the user space stroked curve 2 will be considered. This point p, which is at the position (p1, p2) in user space 4, has, as shown in FIG. 3, an associated (unit) normal vector n (where $\|\mu n\|=1$). There is a corresponding point q on the boundary of the curve 2, which corresponds to the point p when extruded along the normal vector n to the boundary of the curve 2 (i.e. for a distance w/2, where w is the defined user space stroke width). Thus q, which is at the position (q1, q2) in user space 4, is at a distance w/2 along the normal vector n from the point p.

In the homogeneous user space 14, before the curve has been transformed by the user-to-projected transformation matrix R, the point p can be considered to at the point $(p_1 \ p_2 \ 1)^T$ and the normal vector n to be $(n_1 \ n_2 \ 0)^T$. If the curve is then transformed by the matrix R (so as to form the transformed stroked curve 16 as shown in FIG. 4), then in the homogeneous projected space 14':

$$p \rightarrow p' = Rp = (p_1' p_2' p_3')^T; \text{ and}$$

$$n \rightarrow n' = Rn = (n_1' n_2' n_3')^T$$

Accordingly, in the transformed form 16 of the user space stroked curve 2 in the homogeneous projected space 14', the point q' on the boundary of the curve 16 corresponding to the boundary point q in user space 4 will correspond to the point p' when extruded along the transformed normal vector n' by a distance equal to half the user space stroke width, thus:

$$q' = p' + \frac{w}{2}n'$$

$$= (\begin{array}{ccc} p_1' & p_2' & p_3' \end{array})^T + \frac{w}{2}(\begin{array}{ccc} n_1' & n_2' & n_3' \end{array})^T$$

$$= \begin{pmatrix} p_1' + \frac{w}{2}n_1' \\ p_2' + \frac{w}{2}n_2' \\ p_3' + \frac{w}{2}n_3' \end{pmatrix}$$

When the transformed curve 16 in homogeneous projected space 14' undergoes a perspective division, so as to again be represented in a 2D space, i.e. the projected space 12, then, as shown in FIG. 5, the point p' in homogeneous projected space 14' is projected to the position p'' in the projected space 12, which corresponds to $$\left(\frac{p_1'}{p_3'}, \frac{p_2'}{p_3'}\right)$$

(since the perspective division involves dividing the first and second coordinates in the homogeneous space by the third coordinate in homogeneous space, as is known in the art), and the point q' in homogeneous projected space 14' is projected to the point q'' in projected space 12, which is correspondingly at the position:

$$q'' = \left(\frac{p_1' + \frac{w}{2}n_1'}{p_3' + \frac{w}{2}n_3'}, \frac{p_2' + \frac{w}{2}n_2'}{p_3' + \frac{w}{2}n_3'}\right)$$

Due to the projective transformation, i.e. the component matrix P of the R matrix, reorientating the normal vectors of the end points, such that they are parallel to the y-axis in the projected space 12, and thus, as discussed above, bringing, for example, the vector n'' (which is the projected form of the normal vector n at the point p in the user space stroked curve 2) into closer (and approximate) alignment with the y-axis in the projected space 12, it will be appreciated that an approximate measure of the position of the upper edge (boundary) of the projected stroked curve 18 in the projected space 12 in the y-direction at the position on the x-axis in the projected space of the point p in user space can be given by the position in the y-direction of the point q" in the projected space (which position will be equal to the y position of the point p" (of the centreline of the curve at the point p") plus the y-component of the unit normal vector n" in the projected space multiplied by half the user-space stroke width $$\frac{w}{2}).$$

In other words, and as shown in FIG. 5, the y-position (coordinate) in the projected space 12 of the point s" (which is the "true" boundary of the projected stroked curve 18 in the y-direction at the x-position of the point p" in the projected space) can be approximated by the y-position of a point r" in the projected space having the same y-position (coordinate) as the point q".

Thus one can use the position of the point r" as an approximation of the position of the upper edge (boundary) of the projected stroked curve 18 along the y-axis (width direction) at the x-position (length position) of the point p".

As can be seen from FIG. 5, the position of the point r" in the projected space will be given by the x-coordinate of the point p" and the y-coordinate of the point q". Thus, from the above, it will be appreciated that the coordinates in the projected space of the point r" will be given by:

$$r'' = (p''_x, q''_y) = \left( \frac{p'_1}{p'_3}, \frac{p'_2 + \frac{w}{2}n'_2}{p'_3 + \frac{w}{2}n'_3} \right)$$

The y-coordinate of r", and thus an estimate of the position along the y-axis of the upper boundary of the projected stroked curve 18 in projected space 12, is therefore derivable if one knows the user space stroke width w, the second and third coordinates p2', p3' of the point p' in homogeneous projected space 14', and the second and third components n2', n3' of the unit normal vector n' in homogeneous projected space 14'.

Similarly, it will be appreciated that an estimate of the position along the y-axis of the lower boundary of the projected stroked curve 18 in projected space 12 (not shown in FIG. 5) can be given by the position of the equivalent point to r" below the centreline 100 of the curve, denoted as r" (lower) (with the point r" in this terminology being denoted as r" (upper)):

$$r''(\text{lower}) = (p''_x, q''_{yL}) = \left( \frac{p'_1}{p'_3}, \frac{p'_2 - \frac{w}{2}n'_2}{p'_3 - \frac{w}{2}n'_3} \right)$$

Again, the desired y-position in the projected space of the lower boundary of the curve, $$\frac{p'_2 - \frac{w}{2}n'_2}{p'_3 - \frac{w}{2}n'_3},$$

can be derived once one knows the user space stroke width w, the second and third coordinates p2', p3' of the point p' in homogeneous projected space 14', and the second and third components n2', n3' of the unit normal vector n' in homogeneous projected space 14'.

These two estimated upper and lower y values for the boundaries (edges) of the projected form of the stroked curve at the point p", i.e. r"(upper) and r"(lower), can then be used to derive an estimated range of y positions covered by the projected form of the stroked curve at the respective x position (which range of y positions can then be tested against a sampling point as discussed above).

Therefore by determining and storing each of these four coordinate values (which will be scalar values) for a respective x position in the projected space (which will correspond to $$\frac{p'_1}{p'_3})$$

(i.e. such that they can be looked up using that x-position), that information can be used, together with the user space stroke width w (which will be a known parameter), to estimate a maximum y-value and a minimum y-value that together define the range of positions along the y-axis covered by the projected form of the stroked curve at the x position in question.

In this embodiment, the predetermined "extent-estimating" information that is stored and used for a given position along the stroked curve will therefore comprise these four coordinate values, i.e. p2', p3', n2' and n3'.

In this arrangement, p2' and p3' represent (can be used to derive), in effect, the y position of the centreline of the projected form of the stroked curve at the "length" position in question, and n2' and n3' represent (can be used to derive), in effect, the y component of the transformed and projected unit normal vector to the centreline of the projected form of the stroked curve at the "length" position in question.

It will therefore be seen that by calculating and storing the values p2', p3', n2' and n3' for a plurality of positions along the x-axis (in the projected space), then it is possible to build a data store containing information (the predetermined "extent-estimating" information mentioned above) that can be used, in a manner discussed in more detail below, to determine whether a sampling point in surface space 6 falls within the stroked curve or not.

The Applicants have further recognised that a more accurate estimate of the upper and lower edges of the projected stroked curve may be obtained by applying an adjustment factor in the above process. This may give a better rendering quality, particularly for stroked curves having a larger width, and for a wider range of curve shapes and thicknesses.

Thus, in another preferred embodiment, which is described with reference to FIG. 6, the position along the y-axis of the upper boundary of the projected stroked curve, i.e. of the point s", is estimated as being the y-coordinate of a point u" in the projected space 12, where u" is the projection of a point u' in the homogeneous projected space 14', and is defined as follows:

i) u" lies along the width (y-axis) direction from p", i.e. the x-coordinate of u" is the same as the x-coordinate of p"; and ii) the direction of the line passing through q' and u' is parallel to the tangent t' to the centreline 100 of the transformed curve 16 in homogeneous projected space 14' at the point p'.

It will be appreciated that the second condition above requires that:

$$u' = q' + \lambda t',$$

where $\lambda$ is some scalar value.

Thus, by applying the second condition to the first condition, which requires that $$p''_x = \frac{p'_1}{p'_3} = \frac{u'_1}{u'_3},$$

it follows that:

$$p''_x = \frac{q'_1 + \lambda t'_1}{q'_3 + \lambda t'_3},$$

which on rearranging, leads to:

$$\lambda(t'_1 - p''_x t'_3) = \frac{w}{2}\left(\frac{p'_1 n'_3}{p'_3} - n'_1\right),$$

and therefore that:

$$\lambda = \frac{w}{2}\left(\frac{p'_1 n'_3 - p'_3 n'_1}{p'_3 t'_1 - p'_1 t'_3}\right)$$

Thus, $$u' = q' + t' = \left(p' + \frac{w}{2}n'\right) + \lambda t'$$

$$= p' + \frac{w}{2}\left(n' - \frac{p'_1 n'_3 - p'_3 n'_1}{p'_1 t'_3 - p'_3 t'_1} t'\right)$$

As discussed above, it has been appreciated that improved estimates of the position along the y-axis of the upper and lower boundaries of the projected stroked curve 18 in projected space 12 will be given by $$u''_y = \frac{u'_2}{u'_3},$$

which are, respectively:

$$u''_y(\text{upper}) = \frac{p'_2 + \frac{w}{2}\left(n'_2 - \frac{p'_1 n'_3 - p'_3 n'_1}{p'_1 t'_3 - p'_3 t'_1} t'_2\right)}{p'_3 + \frac{w}{2}\left(n'_3 - \frac{p'_1 n'_3 - p'_3 n'_1}{p'_1 t'_3 - p'_3 t'_1} t'_3\right)}; \text{ and}$$

$$u''_y(\text{lower}) = \frac{p'_2 - \frac{w}{2}\left(n'_2 - \frac{p'_1 n'_3 - p'_3 n'_1}{p'_1 t'_3 - p'_3 t'_1} t'_2\right)}{p'_3 - \frac{w}{2}\left(n'_3 - \frac{p'_1 n'_3 - p'_3 n'_1}{p'_1 t'_3 - p'_3 t'_1} t'_3\right)}$$

In this case, the predetermined extent-estimating information that is calculated and stored for a given "length" position will therefore be the values $p_2'$, $p_3'$, $$\left(n'_2 - \frac{p'_1 n'_3 - p'_3 n'_1}{p'_1 t'_3 - p'_3 t'_1} t'_2\right) \text{ and } \left(n'_3 - \frac{p'_1 n'_3 - p'_3 n'_1}{p'_1 t'_3 - p'_3 t'_1} t'_3\right).$$

In this arrangement, the factor $$\frac{p'_1 n'_3 - p'_3 n'_1}{p'_1 t'_3 - p'_3 t'_1} t'$$

that is applied to the unit normal vector component, n2', n3' is, as discussed above, in effect an adjustment factor that is based, inter alia, on the tangent vector t' in the homogeneous projected space, i.e. it applies an adjustment factor that is based, inter alia, on the unit tangent vector t' to the unit normal vector n'.

In the present embodiment, the predetermined extent-estimating data (of either form discussed above) is stored in the form of a 1D graphics texture. For example, in the present embodiment, the graphics texture is a 4-channel (RGBA) texture, and each texel of the texture is associated with a given position along the x-axis in the projected space. The red-channel of each texel is used to store the $p_2'$ value (for each x-position), whilst the green-, blue- and alpha-channels are used to store the $p_3'$, $n_2'$ and $n_3'$ values or $p_3'$, $$\left(n'_2 - \frac{p'_1 n'_3 - p'_3 n'_1}{p'_1 t'_3 - p'_3 t'_1} t'_2\right) \text{ and } \left(n'_3 - \frac{p'_1 n'_3 - p'_3 n'_1}{p'_1 t'_3 - p'_3 t'_1} t'_3\right),$$

respectively. Other arrangements would, of course, be possible. For example, four 1-channel (grayscale) graphics textures could be used to store the predetermined data.

Figure 7:
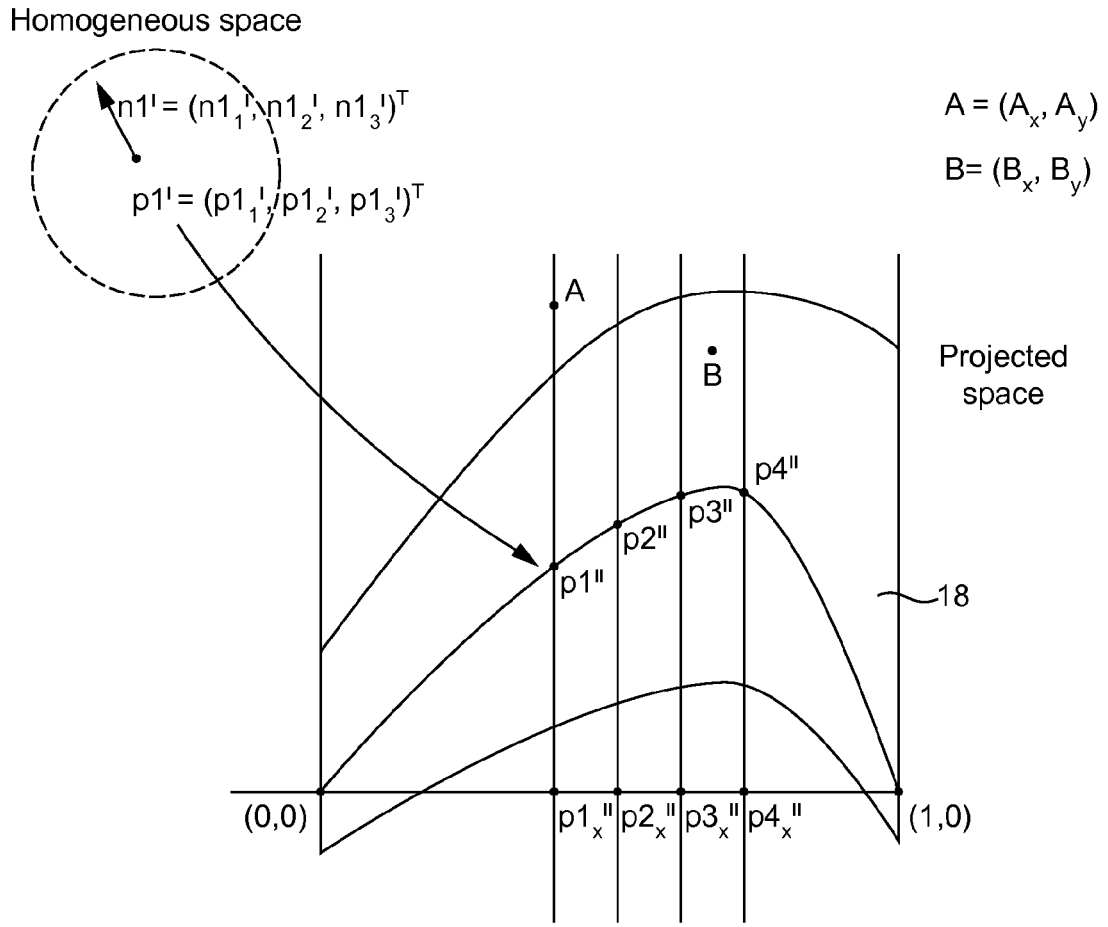
FIG. 7 shows the projected form of a received stroked curve in projected space and a portion of an associated texture containing data for use in rendering the stroked curve.

Accordingly, it will be understood that for a particular stroked curve 2 to be displayed there is created, in the present embodiment, a texture containing the above described predetermined data for a particular projected form of that stroked curve in a projected space, for a plurality of equally spaced points along the x-axis in the projected space. An example of such a texture is shown in FIG. 7, wherein data is stored for four exemplary points on the x-axis: p1x", p2x", p3x" and p4x", where, for example, $$p1''_x = \frac{p1'_1}{p1'_3}.$$

This predetermined (and stored) data can then be used, as discussed above, to determine an approximate measure of the extent of the projected form of the stroked curve 18 along the y-axis for a point on the x-axis in the projected space, and thereby to estimate the range of y-positions in the projected space covered by the projected form of the stroked curve at that point.

For example, and again referring to FIG. 4, the range of y-positions covered by the curve at the point p1x" can be estimated to be the range:

$$\frac{p1'_2 - \frac{w}{2}n1'_2}{p1'_3 - \frac{w}{2}n1'_3} < y < \frac{p1'_2 + \frac{w}{2}n1'_2}{p1'_3 + \frac{w}{2}n1'_3}$$

This estimate of the range of y-positions covered by the curve can then be used to determine whether a point in projected space should be considered to be within the projected form of stroked curve or not.

For example, to determine whether the point A in the projected space in FIG. 7 is within the projected form 18 of the stroked curve, the position of the point A on the y-axis can be compared to the range of y-positions in the projected space covered by the curve at the position of the point A on the x-axis in the projected space, which is the range given above, and the determination made on the basis of the result. In the case of point A, it can be seen (from FIG. 7) that:

$$A_y > \frac{pl'_2 + \frac{w}{2}nl'_2}{pl'_3 + \frac{w}{2}nl'_3}$$

and therefore the point A can be considered not to lie within the projected form of the stroked curve.

The method of rendering a received stroked curve using the technique of the present embodiment will now be described.

In the present embodiment, an application creates or loads a description of a stroked curve that it will require to be rendered, for example, in terms of a plurality of control points and the types of line segments that are to be drawn between the control points, and passes this information to the graphics processing system. For example, and with reference to FIG. 1, the application sends to the system information describing the line segments 1a-1f, which, in this case, are each to be rendered using the technique of the present invention.

The graphics processing system next determines whether one or more of the line segments 1a-1f needs to be subdivided into a plurality of line segments portions in order to be rendered using the technique of the present invention, and subdivides those line segments for which it is deemed necessary. For example, if one of the line segments 1a-1f is a cubic curve with self-intersections or cusps, or is a self-overlapping curve, then the line segment will typically need to be subdivided.

The system then assigns a handle, such as an ID number, to the each of the individual line segments or line segment portions, such that each curve is uniquely identified within the system.

The graphics processing system next determines the R matrix (the user to projected transformation) to be used when converting the curve to its projected form, and, having done that, then determines the appropriate predetermined information as discussed above, in relation to the projected form of the curve, and creates the required texture or textures containing the predetermined information. This is done for each of the individual line segments or line segment portions. The respective R matrix and graphics texture(s) for each line segment are then stored in such a manner so as to be accessible by the system in use, with the stored information being associated with the handle (ID) assigned to the line segment (curve) in question.

This is preferably repeated for each curve that the application may require to be rendered.

Alternatively, the R matrix and predetermined information (e.g. texture(s)) for each of a plurality of stroked curves that could be received be received by the graphics processing system could be determined in advance externally of the system, and stored, for example, on a removable storage medium, such as a CD-ROM or the like. The information stored on the medium could then be input to the graphics processing system, for example by the application, as and when required, instead of being computed at run-time.

Subsequently, when the application requires a curve to be rendered for display, the application will pass to the graphics processing system the user-to-surface transformation (TUS), the user space stroke width w, and the handle (identity) of the curve to be rendered. It will of course be understood that, whilst each of these pieces of information could be passed to the system at the same time, it is more common that they will be passed to the system at different stages in the rendering process.

The handle (ID) of the curve to be rendered, as received from the application, is then used by the graphics processing system to select the stored R matrix and predetermined information (texture or textures) relating to the curve to be rendered. The graphics processing system then uses that information, as discussed in more detail below, to render the curve for display.

For example, and again with reference to FIG. 1, to render a received user space stroked curve 2, the curve is first projected into the surface space 6 using the user-to-surface transformation as received from the application.

A primitive (or primitives) 8 is then generated that covers the projection 7 of the curve in surface space 6, and the primitive(s) is rasterised to define a plurality of sampling points in the surface space.

Each of the sampling points in the surface space 6 is then mapped to a corresponding location in the projected space 12 that the projected form of the stroked curve is defined in, by firstly applying the inverse of the user-to-surface transformation, and then by applying the user-to-projected transformation R for the particular curve being rendered (which as discussed is stored along with the texture to be used for that curve). The transformation is preferably only performed in respect of the vertices of the primitive, with the sampling positions within the primitive then being interpolated, e.g., and preferably, by rasterisation hardware, as is known in the art.

Following this, the sampling point positions in the projected space that correspond to each sampling point position in the surface space (i.e. within the primitive(s) that covers the stroked curve in surface space) will be known. The sampling positions in the projected space can then be tested against the projected form of the stroked curve in the projected space using the predetermined information in relation to that form of the curve stored in the texture(s) for the stroked curve in question in the manner discussed above.

Thus, for each sampling position in the projected space, the appropriate texture(s) is sampled (using the sampling position's x position as a look-up) to obtain the four stored data values for the required position on the x-axis.

Thus, for example, considering the sampling position A in the projected space shown in FIG. 7, the x position in the projected space of that sampling position, i.e. $p1x'''$, will be used as a look-up to sample the texture for the curve in question to obtain the four data values discussed above for the required position on the x-axis.

In the present embodiment, the texture is sampled using bi-linear filtering, so as to allow the relevant data values to be used for a given position along the x-axis in the projected space to be interpolated appropriately where the sampling position in the projected space is at a position along the x-axis for which a set of data is not directly stored (such as will be the case for the point B in FIG. 7). Other filtering or interpolation methods could, of course, also be used.

The four data values derived from sampling the texture are then used, together with stroke width w of the curve as defined in user space (which will received by the graphics processing system to define the curve), to estimate the extent of the projected form of the stroked curve along the y-axis in the projected space for the position on the x-axis in the manner described above, i.e. to determine minimum and maximum values on the y-axis that represent estimates of the upper and lower boundaries of the projected stroked curve at the position on the x-axis in question.

The estimated extent of the projected form of stroked curve along the y-axis in the projected space for the position on the x-axis of the sampling point being considered, i.e. the determined maximum and minimum y-values, is then compared, as discussed above, to the y-position of the sampling point in question in the projected space to determine whether the sampling position in the projected space should be considered to fall within the projected form of the stroked curve or not.

Then, based on the result of this determination, i.e. whether the sampling position in projected space is to be considered to be within the projected form of the stroked curve or not, a corresponding decision can be made in respect of the corresponding sampling position in the surface space, and that surface space sampling position can be retained as being inside the stroked curve, or discarded as being outside the stroked curve, accordingly. Suitable shading data, e.g. RGBA values, can then be assigned to the corresponding sampling point in the surface space.

This process is repeated for each desired sampling point in the surface space (i.e. in practice for each sampling point in surface space in the primitive or primitives that cover the stroked curve in surface space), so as to display the stroked curve appropriately.

The processes of the present invention can be implemented using any suitable graphics processing system, including conventional, existing graphics processing systems.

For example, on programmable graphics hardware, these processes can be implemented in a fragment shader. (When implemented in this manner, i.e. when accepting and rejecting fragments in a fragment shader, if standard multisample antialiasing is consequently disabled, then that could, if desired, be rectified by determining a coverage value for fragments close to the boundary of the curve.)

On fixed-function hardware, the processes of the present invention can be implemented using one or more passes through a rendering pipeline.

The present embodiment can be used to render any desired form of stroked curve, although it will be particularly applicable to the rendering of stroked curves that need to be rendered repeatedly (since it uses stored predetermined information). As discussed above, it is believed that the present invention will be particularly, albeit not exclusively, suited to the rendering of stroked curves that are to be used to construct fonts (e.g. that form all or parts of characters, such as letters) of fonts). Thus, in a particularly preferred embodiment, the stroked curve to be displayed is a stroked curve relating to a character of a font. Similarly, in a preferred embodiment, a plurality of sets of predefined information (e.g. textures), etc., each relating to a stroked curve relating to a character of a font are stored and used.

As will be appreciated by those skilled in the art, various modifications, variations and additions to the present invention as described above and herein would be possible.

For example, in a preferred embodiment, the perspective division values in the homogeneous projected space discussed above are cross-multiplied as this will help to optimise the estimation process. If this is being done, then it is preferable to ensure that all these values are strictly positive. This may be achieved, for example, by checking that the bounding primitives used to render the curve all have positive third scalar values after transformation by the user to projected transformation, at least in the case where those values are then linearly interpolated between the vertices (since in that case checking the values for the vertices of the bounding primitives should ensure that all values within the primitives are positive as well).

Similarly, although the present invention has been described above in relation to using what is effectively a linear rational function of the user space stroke width w to estimate the relevant extent in the y direction of the projected form of the stroked curve (since, as discussed above, the y-position of the edge (boundary) of the projected form of the curve that is used for this purpose is a linear function of the user space stroke width w), it would instead be possible to use other functions of the user space stroke width to estimate the extent of the projected form of the stroked curve in the projected space if desired. For example, a quadratic rational approximation could be used, if desired.

Using higher order, such as quadratic, approximations, may allow for more accurate estimation of the relevant extent of the projected form of the stroked curve (and thus for more accurate rendering), for example by better compensating for the gap between the points u" and s" shown in FIG. 6.

It would also be possible, for example, to implement the testing and comparison steps of the present invention using a "two-pass" approach.

In such an embodiment, a first pass could be used to determine the minimum and maximum y-values, as described above, for a regular sampling of positions along the x-axis using the user space stroke width w and the predetermined data in the relevant texture or textures. These maximum and minimum y-values could then be stored in a further texture (or, if necessary, textures) in a similar manner to that described above in relation to the textures storing the predetermined data (i.e. such that each texel of the further texture stores a scalar value that either represents either the minimum y-value or the maximum y-value for a particular x position, and the further texture is sampled using the position along the x-axis being tested).

This texture could then be sampled in a second pass, by rasterising the primitive, e.g. bounding polygon 8, as discussed above, and determining whether a sampling point is within the stroked curve or not by sampling the further texture to look up the stored maximum and minimum y-values for a particular x-position, and comparing the y-position of the sampling point against this determined range.

Performing the present invention in this manner, i.e. using a "two-step" approach, would move some of the processing from being per-fragment operations (a 2D domain) to per x-operation (a 1D domain), albeit potentially at the expense of set-up overhead and potentially non-uniform sampling of the domain.

As discussed above, in the present embodiment of the present invention, the projection of the stroked curve into the projected space is of a form that places the end points of the stroked curve at two separate locations along one of the basis vectors of the projected space, i.e. the x-axis. Furthermore, the normal vectors associated with the end points of the stroked curve are reorientated so as to lie along the other basis vector of the projected space, i.e. the y-axis.

As will be appreciated from the above, this reorientation of the normal vectors closer to the y-axis direction means that the points r" and u" will be closer to the "true" edge point s" of the projected form of the curve, thereby making the estimations used in the present invention more accurate. It is therefore preferred for the R matrix to include a projective component, i.e. the matrix P, so as to reorientate the normal vectors in the projected form of the stroked curve in this manner. However, it is also contemplated in other embodiments that the R matrix does not reorientate the user space normal vectors in this fashion (e.g. the R matrix may simply consist of the affine matrix M). Although in this case the "estimated" projected form of the stroked curve may be less accurate than when the user-to-projected transformation does reorientate the normal vectors as discussed above, the Applicants have found that such an arrangement of the present invention can still be used to render stroked curves satisfactorily, at least in some cases.

Whilst the present invention has been discussed with regard to embodiments using rasterisation based techniques, it is also contemplated that the present invention can be used with ray-tracing based techniques. In such techniques, as is known in the art, the path of a ray from the viewer's eye is traced through each position in surface (screen) space into the scene to determine what is hit, and thus what the viewer sees. Accordingly, when the scene comprises a stroked curve, a determination has to be made as to whether a ray hits or misses the stroked curve, and, as will be appreciated, such a determination can be made using the technique of the present invention.

It can be seen from the above that the present invention, in its preferred embodiments at least, provides a method and apparatus for rendering stroked curves, and that can, inter alia, be implemented on traditional fixed-function 3D graphics hardware and unmodified, existing hardware graphics accelerators, in a substantially more efficient manner (in terms of load on the CPU) than is possible with conventional techniques.

In particular, the present invention, in its preferred embodiments at least, requires only a one-dimensional table of predetermined information. This makes it, inter alia, memory efficient.

Moreover, the predetermined information is invariant to translation, rotation and uniform scaling of a stroked curve and to changes to the stroke width of the curve in user space.

The graphics processing per sampling point operations to implement the invention are also relatively straightforward, and so can, for example, be implemented using only fixed-function graphics hardware.

This is achieved, in the preferred embodiments of the present invention at least, by using a projective transformation of a stroked curve in user space to a projected space that makes the normals to the curve in user space approximately parallel to a desired direction in the projected space. By making the normals close to parallel a first-order approximation is able to yield sufficiently accurate results, even for relatively large stroke widths.

Predetermined information relating to the projected form of the stroked curve is then derived and stored in the form of a look-up table which is preferably encoded as a 1D texture. This texture can then be sampled when rendering the stroked curve for display to derive information to allow it to be determined whether or not a given sampling position should be considered to fall within the stroked curve or not.

The invention claimed is:

1. A method of rendering a stroked curve for display in a graphics processing system, the method comprising:
   receiving an input stroked curve defined in user space to be displayed;
   transforming the received stroked curve using a received transformation into a surface space for display; and
   for each of one or more sampling points in the surface space:
   determining a corresponding sampling position in a projected space;
   using stored predetermined information relating a width value for each length position along a projected form of the stroked curve in the projected space, which predetermined information is invariant to translation, rotation and uniform scaling of the stroked curve, to estimate the extent in a defined width direction of the projected form of the stroked curve in the projected space at a position along the length of the projected form of the stroked curve in the projected space having a same position along the length of the projected form of the stroked curve as the corresponding sampling position in the projected space;
   using the estimated extent in the defined width direction of the projected form of the stroked curve in the projected space at the position along the length of the projected form of the stroked curve to determine whether the corresponding sampling position in the projected space falls within the projected form of the stroked curve or not; and
   assigning data for rendering the received stroked curve for display to the respective sampling point in the surface space that corresponds to the corresponding sampling position in the projected space in accordance with said determination.

2. The method as claimed in claim 1, wherein said receiving an input stroked curve comprises:
   receiving the position of a plurality of control points in user space, information indicating the type of curve, and information indicating a stroke width in user space.

3. The method as claimed in claim 1, wherein said determining a corresponding sampling position in a projected space comprises:
   mapping the sampling point in surface space to a corresponding location in user space; and then
   mapping the corresponding location in user space to a corresponding location in the projected space,
   said mapping the corresponding location in user space to a corresponding location in the projected space comprising:
   placing the sampling point in user space into a homogeneous space;
   applying a transformation to the sampling point in the homogeneous space; and
   projecting the transformed sampling point in homogeneous space into the projected space by applying a perspective division to the sampling point in the homogeneous space.

4. The method as claimed in claim 1, wherein the corresponding sampling position in the projected space is determined using a predefined or predetermined transformation.

5. The method as claimed in claim 1, wherein said projected form of the stroked curve is at least one of:
   a transformed form of the stroked curve in user space in which at least two points on the stroked curve as defined in user space are placed at selected locations in the projected space; and
   a transformed form of the stroked curve in user space in which the relative orientation of the normal vectors associated with at least two points on the stroked curve as defined in user space is changed such that those normal vectors are parallel to each other in the projected space.

6. The method as claimed in claim 1, wherein said using stored predetermined information relating a width value for each length position along a projected form of the stroked curve in the projected space, which predetermined information is invariant to translation, rotation and uniform scaling of the stroked curve, to estimate the extent in a defined width direction of the projected form of the stroked curve comprises:

using predetermined information to estimate the extent in a first axis direction in the projected space of the projected form of the stroked curve at a position along a second axis direction in the projected space corresponding to the position of the corresponding sampling point in that second axis direction.

7. The method as claimed in claim 1, wherein said stored predetermined information relating a width value for each length position along a projected form of the stroked curve in the projected space, which predetermined information is invariant to translation, rotation and uniform scaling of the stroked curve, is used to determine a first location along the defined width direction that represents an estimate of the upper boundary of the projected form of the stroked curve, and a second location along the defined width direction that represents an estimate of the lower boundary of the projected form of the stroked curve.

8. The method as claimed in claim 1, wherein said predetermined information is stored in one or more data structures for each of a plurality of points along a defined direction in the projected space.

9. The method as claimed in claim 8, wherein said one or more data structures comprise one or more one-dimensional graphics textures.

10. An apparatus for rendering a stroked curve for display in a graphics processing system, the apparatus comprising one or more processing circuits that:

receive an input stroked curve defined in user space to be displayed;

transform the received stroked curve using a received transformation into a surface space for display; and, for each of one or more sampling points in the surface space, determine a corresponding sampling position in a projected space;

use stored predetermined information relating a width value for each length position along a projected form of the stroked curve in the projected space, which predetermined information is invariant to translation, rotation and uniform scaling of the stroked curve, to estimate the extent in a defined width direction of the projected form of the stroked curve in the projected space at a position along the length of the projected form of the stroked curve in the projected space having a same position along the length of the projected form of the stroked curve as the corresponding sampling position in the projected space;

use the estimated extent in the defined width direction of the projected form of the stroked curve in the projected space at the position along the length of the projected form of the stroked curve to determine whether the corresponding sampling position in the projected space falls within the projected form of the stroked curve or not; and assign data for rendering the received stroked curve for display to the respective sampling point in surface space that corresponds to the corresponding sampling position in the projected space in accordance with said determination.

11. The apparatus as claimed in claim 10, wherein said one or more processing circuits are configured to receive an input stroked curve by being configured to receive the position of a plurality of control points in user space, information indicating the type of curve, and information indicating a stroke width in user space.

12. The apparatus as claimed in claim 10, wherein said one or more processing circuits are configured to determine a corresponding sampling position in a projected space by being configured to:

map the sampling point in surface space to a corresponding location in user space;

place the sampling point in user space into a homogeneous space;

apply a transformation to the sampling point in the homogeneous space; and project the transformed sampling point in homogeneous space into the projected space by applying a perspective division to the sampling point in the homogeneous space.

13. The apparatus as claimed in claim 10, wherein said projected form of the stroked curve is at least one of:

a transformed form of the stroked curve in user space in which at least two points on the stroked curve as defined in user space are placed at selected locations in the projected space; and a transformed form of the stroked curve in user space in which the relative orientation of the normal vectors associated with at least two points on the stroked curve as defined in user space is changed such that those normal vectors are parallel to each other in the projected space.

14. The apparatus as claimed in claim 10, wherein said one or more processing circuits use stored predetermined information relating a width value for each length position along a projected form of the stroked curve in the projected space, which predetermined information is invariant to translation, rotation and uniform scaling of the stroked curve, to estimate the extent in a defined width direction of the projected form of the stroked curve is configured to use the predetermined information to estimate the extent in a first axis direction in the projected space of the projected form of the stroked curve at a position along a second axis direction in the projected space corresponding to the position of the corresponding sampling point in that second axis direction.

15. The apparatus as claimed in claim 10, wherein said one or more processing circuits use stored predetermined information relating a width value for each length position along a projected form of the stroked curve in the projected space, which predetermined information is invariant to translation, rotation and uniform scaling of the stroked curve, to estimate the extent in a defined width direction of the projected form of the stroked curve is configured to determine a first location along the defined width direction that represents an estimate of the upper boundary of the projected form of the stroked curve, and a second location along the defined width direction that represents an estimate of the lower boundary of the projected form of the stroked curve.

16. The apparatus as claimed in claim 10, wherein said predetermined information is stored in one or more data structures for each of a plurality of points along a defined direction in the projected space.

17. The apparatus as claimed in claim 16, wherein said one or more data structures comprise one or more one-dimensional graphics textures.

* * * * *